United States Patent
Lu et al.

(10) Patent No.: US 11,272,528 B2
(45) Date of Patent: Mar. 8, 2022

(54) SCHEDULING ASSIGNMENT INFORMATION TRANSMISSION METHOD AND SYSTEM, AND DEVICE

(71) Applicant: HUAWEI TECHNOLOGIES CO., LTD., Guangdong (CN)

(72) Inventors: Zhenwei Lu, Beijing (CN); Deping Liu, Beijing (CN); Yi Shi, Beijing (CN); Zhenshan Zhao, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 155 days.

(21) Appl. No.: 16/270,671

(22) Filed: Feb. 8, 2019

(65) Prior Publication Data
US 2019/0174528 A1 Jun. 6, 2019

Related U.S. Application Data
(63) Continuation of application No. PCT/CN2016/094713, filed on Aug. 11, 2016.

(51) Int. Cl.
*H04W 72/12* (2009.01)
*H04L 5/00* (2006.01)
(Continued)

(52) U.S. Cl.
CPC ....... *H04W 72/1289* (2013.01); *H04L 5/0037* (2013.01); *H04L 5/0053* (2013.01);
(Continued)

(58) Field of Classification Search
None
See application file for complete search history.

(56) References Cited

U.S. PATENT DOCUMENTS

| 2013/0322413 A1* | 12/2013 | Pelletier | H04L 1/1822 370/336 |
| 2014/0086168 A1* | 3/2014 | Bao | H04L 5/0096 370/329 |

(Continued)

FOREIGN PATENT DOCUMENTS

| CN | 104981021 A | 10/2015 |
| CN | 105307216 A | 2/2016 |

(Continued)

OTHER PUBLICATIONS

ITL, "Considerations on resource allocation mechanism for V2V," 3GPP TSG RAN WG1 Meeting #84-bis, R1-163306; Busan, Korea, Apr. 11-15, 2016, 7 pages.

(Continued)

*Primary Examiner* — Andrew C Oh
(74) *Attorney, Agent, or Firm* — Fish & Richardson P.C.

(57) ABSTRACT

Example scheduling assignment information transmission methods, systems, and devices are described. One example method includes obtaining, by a user equipment (UE), a multiplexing manner used to indicate a relationship between a time-frequency resource for transmitting scheduling assignment information and a time-frequency resource for transmitting data information. The UE receives downlink control information comprising scheduling assignment resource indication information sent by a network device, and obtains, based on the scheduling assignment resource indication information and the multiplexing manner, resource location information occupied to transmit the scheduling assignment information. The UE can then transmit the scheduling assignment information based on the resource location information occupied by the scheduling assignment information.

20 Claims, 10 Drawing Sheets

(51) Int. Cl.
  *H04W 92/16* (2009.01)
  *H04W 92/18* (2009.01)
  *H04W 8/00* (2009.01)
(52) U.S. Cl.
  CPC .......... *H04L 5/0058* (2013.01); *H04L 5/0092* (2013.01); *H04W 92/16* (2013.01); *H04W 92/18* (2013.01); *H04W 8/005* (2013.01)

(56) References Cited

U.S. PATENT DOCUMENTS

| | | | | |
|---|---|---|---|---|
| 2015/0327183 | A1* | 11/2015 | Park | H04W 8/005 370/311 |
| 2015/0327315 | A1* | 11/2015 | Xue | H04L 5/0005 370/330 |
| 2016/0021694 | A1* | 1/2016 | Pan | H04W 72/0413 370/329 |
| 2016/0037512 | A1* | 2/2016 | Lei | H04W 72/04 370/336 |
| 2016/0044619 | A1* | 2/2016 | Ryu | H04W 72/0446 370/350 |
| 2016/0044669 | A1* | 2/2016 | Yoon | H04W 76/14 370/336 |
| 2016/0044694 | A1* | 2/2016 | Park | H04W 72/10 370/329 |
| 2016/0057798 | A1* | 2/2016 | Chae | H04W 72/0406 370/280 |
| 2016/0128082 | A1* | 5/2016 | Chen | H04W 72/1247 370/329 |
| 2016/0142991 | A1* | 5/2016 | Glasson | H04W 76/14 370/350 |
| 2016/0150435 | A1* | 5/2016 | Baek | H04W 24/10 370/252 |
| 2016/0174174 | A1* | 6/2016 | Chae | H04W 56/001 370/350 |
| 2016/0174179 | A1* | 6/2016 | Seo | H04W 56/0015 370/350 |
| 2016/0183276 | A1* | 6/2016 | Marinier | H04W 72/12 370/329 |
| 2016/0205525 | A1* | 7/2016 | Baghel | H04W 72/042 370/329 |
| 2016/0295624 | A1* | 10/2016 | Novlan | H04W 72/04 |
| 2016/0309451 | A1* | 10/2016 | Ye | H04W 72/042 |
| 2016/0345325 | A1* | 11/2016 | Liu | H04W 74/0833 |
| 2016/0381666 | A1* | 12/2016 | Kim | H04W 72/042 370/329 |
| 2017/0006580 | A1* | 1/2017 | Patil | H04L 5/0007 |
| 2017/0034688 | A1* | 2/2017 | Kim | G01S 5/26 |
| 2017/0041931 | A1 | 2/2017 | Feng et al. | |
| 2017/0055240 | A1* | 2/2017 | Kim | H04W 76/14 |
| 2017/0150330 | A1* | 5/2017 | Kim | H04W 48/16 |
| 2017/0164249 | A1* | 6/2017 | Uemura | H04W 72/1215 |
| 2017/0164381 | A1* | 6/2017 | Kim | H04L 5/0007 |
| 2017/0164396 | A1* | 6/2017 | Matsumoto | H04W 72/02 |
| 2017/0208490 | A1* | 7/2017 | Lu | H04W 24/04 |
| 2017/0208616 | A1* | 7/2017 | Panteleev | H04W 72/0446 |
| 2017/0215154 | A1* | 7/2017 | Kim | H04W 52/34 |
| 2017/0223711 | A1* | 8/2017 | Wang | H04L 5/0012 |
| 2017/0245313 | A1* | 8/2017 | Kim | H04L 1/1854 |
| 2017/0257846 | A1* | 9/2017 | Kim | H04L 5/0091 |
| 2017/0295554 | A1* | 10/2017 | Lee | H04W 56/0025 |
| 2017/0295601 | A1* | 10/2017 | Kim | H04W 72/0406 |
| 2017/0303222 | A1* | 10/2017 | Lee | H04W 56/001 |
| 2017/0303277 | A1 | 10/2017 | Wang et al. | |
| 2017/0303282 | A1* | 10/2017 | Lee | H04B 7/15542 |
| 2017/0303291 | A1* | 10/2017 | Chae | H04W 76/14 |
| 2017/0311344 | A1* | 10/2017 | Lee | H04L 5/0007 |
| 2017/0339670 | A1* | 11/2017 | Chae | H04W 72/0446 |
| 2017/0366328 | A1* | 12/2017 | Seo | H04L 1/0009 |
| 2017/0367087 | A1* | 12/2017 | Seo | H04W 72/02 |
| 2017/0373735 | A1* | 12/2017 | Kim | H04L 5/0051 |
| 2017/0373738 | A1* | 12/2017 | Chae | H04B 7/0626 |
| 2017/0374539 | A1* | 12/2017 | Chae | H04L 29/08 |
| 2018/0034609 | A1* | 2/2018 | Kim | H04L 5/0023 |
| 2018/0035447 | A1* | 2/2018 | Kim | H04W 72/1278 |
| 2018/0054253 | A1* | 2/2018 | Seo | H04B 7/2606 |
| 2018/0077633 | A1* | 3/2018 | Chae | H04W 48/16 |
| 2018/0077662 | A1* | 3/2018 | Kim | H04W 16/24 |
| 2018/0077684 | A1* | 3/2018 | Seo | H04W 88/02 |
| 2018/0098299 | A1* | 4/2018 | Chae | H04W 76/14 |
| 2018/0098321 | A1* | 4/2018 | Chae | H04W 56/0015 |
| 2018/0115865 | A1* | 4/2018 | Chae | G01C 5/06 |
| 2018/0115970 | A1* | 4/2018 | Chae | G08G 1/012 |
| 2018/0124682 | A1* | 5/2018 | Chae | H04L 1/00 |
| 2018/0132254 | A1* | 5/2018 | Chae | H04W 76/14 |
| 2018/0139586 | A1* | 5/2018 | Park | H04W 4/06 |
| 2018/0139640 | A1* | 5/2018 | Chae | H04W 72/1231 |
| 2018/0139794 | A1* | 5/2018 | Chae | H04W 56/00 |
| 2018/0145808 | A1* | 5/2018 | Kim | H04B 7/04 |
| 2018/0146491 | A1* | 5/2018 | Kim | H04W 28/0268 |
| 2018/0152272 | A1* | 5/2018 | Chae | H04W 4/70 |
| 2018/0175982 | A1* | 6/2018 | Kim | H04W 16/10 |
| 2018/0176891 | A1* | 6/2018 | Kim | H04W 24/08 |
| 2018/0176903 | A1* | 6/2018 | Lee | H04W 72/042 |
| 2018/0176973 | A1* | 6/2018 | Kim | H04W 72/1278 |
| 2018/0184348 | A1* | 6/2018 | Uemura | H04W 4/70 |
| 2018/0192397 | A1* | 7/2018 | Seo | H04W 72/02 |
| 2018/0206211 | A1* | 7/2018 | Seo | H04W 4/70 |
| 2018/0213549 | A1* | 7/2018 | Kim | H04L 1/00 |
| 2018/0220388 | A1* | 8/2018 | Chae | H04W 56/0015 |
| 2018/0234807 | A1* | 8/2018 | Park | H04W 72/048 |
| 2018/0234938 | A1* | 8/2018 | Chae | G01S 5/0252 |
| 2018/0249518 | A1* | 8/2018 | Nguyen | H04W 4/10 |
| 2018/0317239 | A1* | 11/2018 | Wang | H04W 72/12 |
| 2018/0338319 | A1* | 11/2018 | Kim | H04L 27/2678 |
| 2018/0359777 | A1* | 12/2018 | Lei | H04W 72/0453 |
| 2018/0368080 | A1* | 12/2018 | Chae | H04W 52/36 |
| 2018/0376474 | A1* | 12/2018 | Khoryaev | H04W 76/14 |
| 2019/0014490 | A1* | 1/2019 | Kim | H04W 24/02 |
| 2019/0029006 | A1* | 1/2019 | Wang | H04W 72/1289 |
| 2019/0045345 | A1* | 2/2019 | Lee | H04W 4/06 |
| 2019/0089451 | A1* | 3/2019 | Seo | H04W 88/04 |
| 2019/0116609 | A1* | 4/2019 | Feng | H04W 72/042 |
| 2019/0182840 | A1* | 6/2019 | Feng | H04W 74/0816 |

FOREIGN PATENT DOCUMENTS

| | | |
|---|---|---|
| CN | 105338637 A | 2/2016 |
| CN | 105490793 A | 4/2016 |
| CN | 105517159 A | 4/2016 |
| EP | 3402276 A1 | 11/2018 |
| EP | 3481125 A1 | 5/2019 |
| WO | 2015184916 A1 | 12/2015 |
| WO | 2016019557 A1 | 2/2016 |
| WO | WO-2016045094 | * 3/2016 |

OTHER PUBLICATIONS

Office Action issued in Japanese Application No. 2019-507249 dated Feb. 4, 2020, 8 pages (with English translation).
Samsung, "Resource Pool for V2V," 3GPP TSG RAN WG1 #84, R1-160575; St Julian's, Malta, Feb. 15-19, 2016, 3 pages.
Extended European Search Report issued in European Application No. 16912277.7 dated Jul. 18, 2019, 13 pages.
R1-143153—NEC, "Distributed resource allocation and pre-emption access for Mode2 communication," 3GPP TSG RAN WG1 Meeting #78, Dresden, Germany, XP050788631, Aug. 18-22, 2014, 6 pages.
R1-160283—Huawei et al., "Resource pool design," 3GPP TSG RAN WG1 Meeting #84, St Julian's, Malta, XP051053623 , Feb. 15-19, 2016, 5 pages.
R1-162272—CATT, "Discussion on SA and data resource pool allocation," 3GPP TSG RAN WG1 Meeting #84bis, Busan, Korea, XP051080077, Apr. 11-15, 2016, 4 pages.
R1-165207—NTT DOCOMO, Inc., "Evaluation of PC5 transport for V2P/V2I/I2V communications," 3GPP TSG RAN WG1 Meeting #85, Nanjing, China, XP051096212, May 23-27, 2016, 5 pages.
Qualcomm Incorporated,"Resource Pool Design for V2V",3GPP TSG-RAN WG1 #85 R1-164423,May 23-27, 2016,Nanjing, China,total 5 pages.

(56) References Cited

OTHER PUBLICATIONS

Qualcomm Incorporated,"Scheduling Assignments for V2V",3GPP TSG-RAN WG1 #84bis R1-163035,Apr. 11-15, 2016,Busan, South Korea,total 6 pages.
3GPP TS 36.321 V13.2.0 (Jun. 2016);3rd Generation Partnership Project;Technical Specification Group Radio Access Network,Evolved Universal Terrestrial Radio Access (E-UTRA);Medium Access Control (MAC) protocol specification (Release 13),total 91 pages.
3GPP TS 36.212 V13.2.0 (Jun. 2016);3rd Generation Partnership Project;Technical Specification Group Radio Access Network;Evolved Universal Terrestrial Radio Access (E-UTRA);Multiplexing and channel coding(Release 13),total 140 pages.
3GPP TS 36.331 V13.2.0 (Jun. 2016);3rd Generation Partnership Project;Technical Specification Group Radio Access Network,Evolved Universal Terrestrial Radio Access (E-UTRA);Radio Resource Control (RRC);Protocol specification Release 13),total 623 pages.
3GPP TS 36.213 V13.2 0 (Jun. 2016);3rd Generation Partnership Project;Technical Specification Group Radio Access Network;Evolved Universal Terrestrial Radio Access (E-UTRA);Physical layer procedures(Release 13),total 381 pages.
PCT International Search Report in International Appln. No. PCT/CN2016/094713, dated May 12, 2017, 15 pages (with English translation).
Office Action issued in Chinese Application No. 201680088036.7 dated Dec. 27, 2019, 18 pages (with English translation).

\* cited by examiner

SCHEDULING ASSIGNMENT INFORMATION TRANSMISSION METHOD AND SYSTEM, AND DEVICE

CROSS-REFERENCE TO RELATED APPLICATIONS

This application is a continuation of International Application No. PCT/CN2016/094713, filed on Aug. 11, 2016, the disclosure of which is hereby incorporated by reference in its entirety.

TECHNICAL FIELD

The present invention relates to the field of communications technologies, and in particular, to a scheduling assignment information transmission method and system, and a device.

BACKGROUND

Device-to-device (D2D) communication is a communication mode in which two peer terminals directly communicate with each other without using a base station. The base station may perform resource configuration, scheduling, coordination, and the like, to assist in direct communication between the terminals. The D2D communication includes two characteristics: discovery and communication. The discovery means that a terminal periodically broadcasts information, so that a terminal surrounding the terminal may detect the information and discover the terminal. The communication means that direct data transmission is performed between terminals, and a mechanism of scheduling assignment (SA)+data is used. The SA is used to indicate status information of data sent by a transmit end, and the status information includes time-frequency resource information, modulation and coding scheme (MCS) information, frequency hopping indication information, timing advance information, and receiving group ID information, and the like of the data, so that a receive end can receive service data based on the formation indicated by the SA. The data is service data sent by the transmit end based on the time-frequency resource information indicated by the SA and in a format indicated by the SA.

If a terminal that performs D2D communication is within a coverage area of the base station, the base station configures a transmission resource pool (for example, an SA resource pool and a data resource pool) for the terminal, so that the terminal performs data transmission of the D2D communication. The terminal may perform D2D transmission by using a time-frequency resource configured by the base station for the terminal in the resource pool, or may independently and randomly select a time-frequency resource from a configured resource for D2D transmission.

The Internet of Vehicles (IOV) may implement interconnection and interworking of vehicle-to-vehicle (V2V), vehicle-to-roadside (V2R), vehicle-to-Internet (Vehicle-to-Internet, V2I), vehicle-to-human (V2H), and the like. Currently, a cellular network technology is used for V2V communication in the Internet of Vehicles, so that a base station may be fully used to dynamically schedule a transmission resource, a communication conflict probability is reduced, and a problem of delay uncontrollability is resolved. In Internet of Vehicles based on base station assistance, a base station mainly performs transmission resource configuration, interference coordination, and the like. Because vehicle-to-vehicle communication in an Internet of Vehicles system is also terminal-to-terminal communication, the V2V communication may be considered as the D2D communication.

However, not all D2D communications technologies are applicable to the V2V communication. For example, a method for indicating an SA time-frequency resource by the base station in D2D communication is not applicable to the V2V communication. There are a plurality of multiplexing manners for the SA and the data in the V2V communication, and the multiplexing manner is used to describe a relationship between a time-frequency resource for transmitting the SA and a time-frequency resource for transmitting the data. For example, the multiplexing manner is used to indicate whether the SA and the data are transmitted in different subframes or in a same subframe, or the like. However, the plurality of multiplexing manners for the SA and the data do not exist in the D2D communication. Therefore, if the method for indicating the SA time-frequency resource by the base station in the D2D communication is still used in the V2V communication, a resource occupied to transmit SA information cannot be accurately indicated or obtained, and transmission performance is affected.

SUMMARY

Embodiments of the present invention provide a scheduling assignment information transmission method and system, and a device, so as to accurately indicate or obtain a resource occupied to transmit scheduling assignment information, and further improve transmission performance.

A first aspect of the embodiments of the present invention provides a scheduling assignment information transmission method, including:

obtaining, by a user equipment, a multiplexing manner, where the multiplexing manner is used to indicate a relationship between a time-frequency resource for transmitting scheduling assignment information and a time-frequency resource for transmitting data information;

receiving, by the user equipment, downlink control information sent by a network device, where the downlink control information includes scheduling assignment resource indication information;

obtaining, by the user equipment based on the scheduling assignment resource indication information and the multiplexing manner, resource location information occupied to transmit the scheduling assignment information; and transmitting, by the user equipment, the scheduling assignment information based on the resource location information occupied by the scheduling assignment information.

In the first aspect of the embodiments of the present invention, the resource location information that is occupied to transmit the scheduling assignment information and that is obtained by the user equipment is related to the multiplexing manner, so that accuracy of an obtained resource location of the scheduling assignment information is relatively high, and transmission performance is further improved.

In a possible implementation, the multiplexing manner includes at least one of a first multiplexing manner, a second multiplexing manner, and a third multiplexing manner, the first multiplexing manner indicates that a time domain resource for transmitting the scheduling assignment information is different from a time domain resource for transmitting the data information, in other words, the scheduling assignment information and the data information occupy different subframes; the second multiplexing manner indicates that a time domain resource for transmitting the scheduling assignment information is the same as a time domain resource for transmitting the data information, in other words, the scheduling assignment information and the data information occupy a same subframe, and a frequency domain resource for transmitting the scheduling assignment information is not adjacent to a frequency domain resource for transmitting the data information; and the third multiplexing manner indicates that a time domain resource for transmitting the scheduling assignment information is the same as a time domain resource for transmitting the data information, in other words, the scheduling assignment information and the data information occupy a same subframe, and a frequency domain resource for transmitting the scheduling assignment information is adjacent to a frequency domain resource for transmitting the data information.

In a possible implementation, if the multiplexing manner is the first multiplexing manner, the scheduling assignment resource indication information is used to indicate a time domain resource location and a frequency domain resource location that are occupied to transmit the scheduling assignment information; or if the multiplexing manner is the second multiplexing manner, the scheduling assignment resource indication information is used to indicate a frequency domain resource location occupied to transmit the scheduling assignment information; or if the multiplexing manner is the third multiplexing manner, the scheduling assignment resource indication information is used to indicate a relationship between a frequency domain resource location occupied to transmit the scheduling assignment information and a frequency domain resource location occupied to transmit the data information. In the second multiplexing manner and the third multiplexing manner, because the time domain resource for transmitting the scheduling assignment information is the same as the time domain resource for transmitting the data information, in other words, a time domain resource location occupied to transmit the scheduling assignment information is the same as a time domain resource location occupied to transmit the data information, the scheduling assignment resource indication information only needs to indicate the frequency domain resource location occupied to transmit the scheduling assignment information. Therefore, indication information redundancy can be avoided, and signaling overheads can be reduced.

In a possible implementation, if the multiplexing manner is the first multiplexing manner, the user equipment obtains, based on the scheduling assignment resource indication information and the first multiplexing manner, the time domain resource location and the frequency domain resource location that are occupied to transmit the scheduling assignment information.

In a possible implementation, if the multiplexing manner is the second multiplexing manner, the user equipment obtains, based on the scheduling assignment resource indication information and the second multiplexing manner, the frequency domain resource location occupied to transmit the scheduling assignment information; and the user equipment obtains a time domain resource location occupied to transmit the data information, and determines that the time domain resource location occupied to transmit the data information is a time domain resource location occupied to transmit the scheduling assignment information. In this case, the user equipment may obtain, by using data information resource indication information sent by the network device, the time domain resource location occupied to transmit the data information.

In a possible implementation, if the multiplexing manner is the third multiplexing manner, the user equipment obtains a time domain resource location and the frequency domain resource location that are occupied to transmit the data information, and determines that the time domain resource location for transmitting the data information is a time domain resource location occupied to transmit the scheduling assignment information; and the user equipment obtains, based on the scheduling assignment resource indication information, the third multiplexing manner, and the frequency domain resource location of the data information, the frequency domain resource location occupied to transmit the scheduling assignment information. In this case, the user equipment may obtain, by using data information resource indication information sent by the network device, the time domain resource location and the frequency domain resource location that are occupied to transmit the data information.

In a possible implementation, the downlink control information further includes transmission quantity indication information, the transmission quantity indication information is used to indicate that a quantity of transmission times of the scheduling assignment information is at least one time, and the scheduling assignment resource indication information is used to indicate resource location information occupied to transmit the scheduling assignment information each of the at least one time, so as to more accurately indicate the resource location information occupied to transmit the scheduling assignment information.

In a possible implementation, the user equipment receives multiplexing indication information sent by the network device, to obtain the multiplexing manner, where the multiplexing indication information is used to indicate the multiplexing manner. The multiplexing indication information may be sent by using a Radio Resource Control (RRC) message, a Medium Access Control (MAC) layer message, or a physical layer message. The RRC message may be a system broadcast message, RRC dedicated signaling, or the like. The MAC layer message may be MAC layer signaling, or the like.

In a possible implementation, the user equipment obtains the multiplexing manner based on preconfiguration information. The preconfiguration information is used to indicate the multiplexing manner. The preconfiguration information may be configured by the network device for the user equipment, or may be configured by a manufacturer of the user equipment for the user equipment before delivery.

A second aspect of the embodiments of the present invention provides a scheduling assignment information transmission method, including:

configuring, by a network device, a multiplexing manner for a user equipment, where the multiplexing manner is used to indicate a relationship between a time-frequency resource for transmitting scheduling assignment information and a time-frequency resource for transmitting data information; and sending, by the network device, downlink control information to the user equipment based on the multiplexing manner, where the downlink control information includes scheduling assignment resource indication information, and the scheduling assignment resource indication information is used to indicate resource location information occupied to transmit the scheduling assignment information.

In the second aspect of the embodiments of the present invention, the network device determines the scheduling assignment resource indication information based on the multiplexing manner configured for the user equipment, and notifies the user equipment by using the downlink control information, so that the resource location information that is occupied to transmit the scheduling assignment information and that is obtained by the user equipment is related to the multiplexing manner, accuracy of an obtained resource location of the scheduling assignment information is relatively high, and transmission performance is further improved.

In a possible implementation, the multiplexing manner includes at least one of a first multiplexing manner, a second multiplexing manner, and a third multiplexing manner, the first multiplexing manner indicates that a time domain resource for transmitting the scheduling assignment information is different from a time domain resource for transmitting the data information, in other words, the scheduling assignment information and the data information occupy different subframes; the second multiplexing manner indicates that a time domain resource for transmitting the scheduling assignment information is the same as a time domain resource for transmitting the data information, in other words, the scheduling assignment information and the data information occupy a same subframe, and a frequency domain resource for transmitting the scheduling assignment information is not adjacent to a frequency domain resource for transmitting the data information; and the third multiplexing manner indicates that a time domain resource for transmitting the scheduling assignment information is the same as a time domain resource for transmitting the data information, in other words, the scheduling assignment information and the data information occupy a same subframe, and a frequency domain resource for transmitting the scheduling assignment information is adjacent to a frequency domain resource for transmitting the data information.

In a possible implementation, if the multiplexing manner is the first multiplexing manner, the scheduling assignment resource indication information is used to indicate a time domain resource location and a frequency domain resource location that are occupied to transmit the scheduling assignment information; or if the multiplexing manner is the second multiplexing manner, the scheduling assignment resource indication information is used to indicate a frequency domain resource location occupied to transmit the scheduling assignment information; or if the multiplexing manner is the third multiplexing manner, the scheduling assignment resource indication information is used to indicate a relationship between a frequency domain resource location occupied to transmit the scheduling assignment information and a frequency domain resource location occupied to transmit the data information. In the second multiplexing manner and the third multiplexing manner, because the time domain resource for transmitting the scheduling assignment information is the same as the time domain resource for transmitting the data information, in other words, a time domain resource location occupied to transmit the scheduling assignment information is the same as a time domain resource location occupied to transmit the data information, the scheduling assignment resource indication information only needs to indicate the frequency domain resource location occupied to transmit the scheduling assignment information. Therefore, indication information redundancy can be avoided, and signaling overheads can be reduced.

In a possible implementation, the downlink control information further includes transmission quantity indication information, the transmission quantity indication information is used to indicate that a quantity of transmission times of the scheduling assignment information is at least one time, and the scheduling assignment resource indication information is used to indicate resource location information occupied to transmit the scheduling assignment information each of the at least one time, so as to more accurately indicate the resource location information occupied to transmit the scheduling assignment information.

In a possible implementation, the network device sends multiplexing indication information to the user equipment based on the multiplexing manner. The multiplexing indication information is used to indicate the multiplexing manner, so that the user equipment can obtain the multiplexing manner.

In a possible implementation, the network device configures the multiplexing manner for the user equipment by configuring different multiplexing manners for different resource pools. The multiplexing manner is allocated to the user equipment when a resource pool is allocated to the user equipment, so that the user equipment obtains the multiplexing manner by using the allocated resource pool.

In a possible implementation, the network device configures the multiplexing manner for the user equipment by configuring different multiplexing manners for different cells. Resource pools in one cell have a same multiplexing manner. For example, a multiplexing manner of each resource pool in a cell 1 is the first multiplexing manner. The network device sends the multiplexing indication information to the user equipment based on a cell accessed by the user equipment, so that the user equipment can obtain the multiplexing manner.

A third aspect of the embodiments of the present invention provides a user equipment, including:

a processing unit, configured to obtain a multiplexing manner, where the multiplexing manner is used to indicate a relationship between a time-frequency resource for transmitting scheduling assignment information and a time-frequency resource for transmitting data information;

a receiving unit, configured to receive downlink control information sent by a network device, where the downlink control information includes scheduling assignment resource indication information, where the processing unit is further configured to obtain, based on the scheduling assignment resource indication information and the multiplexing manner, resource location information occupied to transmit the scheduling assignment information; and a sending unit, configured to transmit the scheduling assignment information based on the resource location information occupied by the scheduling assignment information.

The user equipment provided in the third aspect of the embodiments of the present invention is configured to perform the scheduling assignment information transmission method provided in the first aspect of the present invention. For details, refer to the description of the first aspect of the embodiments of the present invention, and details are not described herein again.

A fourth aspect of the embodiments of the present invention provides a network device, including:

a processing unit, adapted to configure a multiplexing manner for a user equipment, where the multiplexing manner is used to indicate a relationship between a time-frequency resource for transmitting scheduling assignment information and a time-frequency resource for transmitting data information; and a sending unit, configured to send downlink control information to the user equipment based on the multiplexing manner, where the downlink control information includes scheduling assignment resource indication information, and the scheduling assignment resource indication information is used to indicate resource location information occupied to transmit the scheduling assignment information.

The user equipment provided in the fourth aspect of the embodiments of the present invention is configured to perform the scheduling assignment information transmission method provided in the second aspect of the present invention. For details, refer to the description of the second aspect of the embodiments of the present invention, and the details are not described herein again.

A fifth aspect of the embodiments of the present invention provides a scheduling assignment information transmission system, and the system includes the user equipment provided in the third aspect and the network device provided in the fourth aspect.

A sixth aspect of the embodiments of the present invention provides a computer storage medium, configured to store a computer software instruction used by the user equipment, where the computer software instruction includes a program designed to execute the foregoing aspects.

A seventh aspect of the embodiments of the present invention provides a computer storage medium, configured to store a computer software instruction used by the network device, where the computer software instruction includes a program designed to execute the foregoing aspects.

In the embodiments of the present invention, the network device configures the multiplexing manner for the user equipment, and sends, based on the multiplexing manner, the downlink control information that includes the scheduling assignment resource indication information to the user equipment; the user equipment obtains the multiplexing manner, receives the downlink control information that includes the scheduling assignment resource indication information and that is sent by the network device, obtains, based on the scheduling assignment resource indication information and the multiplexing manner, the resource location information occupied to transmit the scheduling assignment information, and transmits the scheduling assignment information based on the resource location information occupied by the scheduling assignment information, so that a resource occupied to transmit the scheduling assignment information can be accurately indicated or obtained, and the transmission performance can be further improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1A:
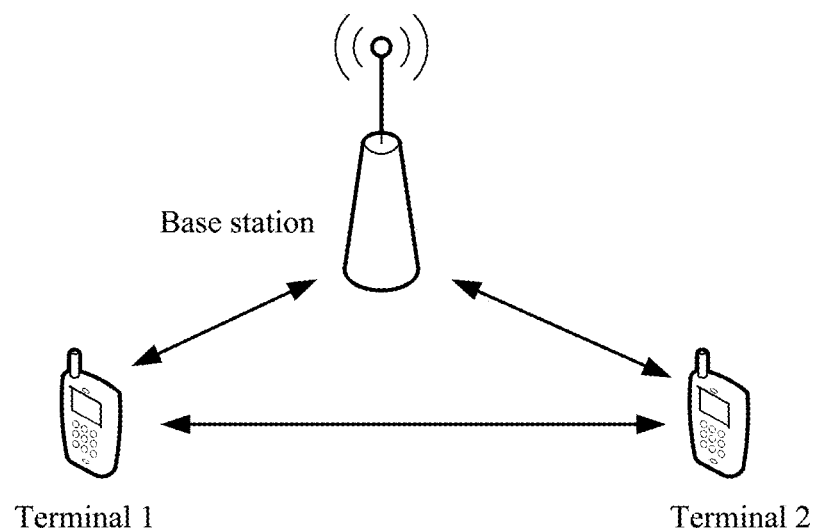
FIG. 1a is a network architectural diagram of D2D communication.

Referring to FIG. 1a, FIG. 1a is a network architectural diagram of D2D communication, including a terminal 1, a terminal 2, and a base station. In actual application, a plurality of terminals are included in a coverage area of one base station. For ease of understanding, only two terminals are used as an example in FIG. 1a. The terminal may include an electronic device having a communication function, such as a mobile phone, a tablet computer (Pad), or an intelligent wearable device (such as a watch or a band). It can be seen from FIG. 1a that both terminals may directly communicate with the base station, and communication may also be performed between the two terminals in the D2D communication. In a process of communication between the terminals, communication may be performed in a multicast manner, or communication may be performed in a broadcast manner. The D2D communication includes two characteristics: discovery and communication. The discovery means that a terminal periodically broadcasts information, so that a terminal surrounding the terminal may detect the information and discover the terminal. The communication means that direct data transmission is performed between terminals, and a mechanism of scheduling assignment (SA)+data is used. The SA is used to indicate status information of data sent by a transmit end, and the status information includes time-frequency resource information, MCS information, frequency hopping indication information, timing advance information, and receiving group ID information, and the like of the data, so that a receive end can receive service data based on the formation indicated by the SA. The data is service data sent by the transmit end based on the time-frequency resource information indicated by the SA and in a format indicated by the SA. In the D2D communication, the base station configures a transmission resource pool (for example, an SA resource pool and a data resource pool) for the terminal, so that the terminal performs data transmission of the D2D communication. The terminal may perform D2D transmission by using a time-frequency resource configured by the base station for the terminal in the resource pool, or may independently and randomly select a time-frequency resource from a configured resource for D2D transmission.

If the terminal performs D2D transmission by using the time-frequency resource configured by the base station for the terminal in the resource pool, the base station allocates, to the terminal by using downlink control information (DCI), a time-frequency resource for transmitting the SA and the data in the resource pool. Specifically, the DCI includes an index field (six bits), a time resource pattern of transmission (T-RPT) field, and a resource assignment (RA) field. The index field is used to indicate an SA time-frequency resource, the T-RPT field is used to indicate a time domain resource of the data, and the RA field is used to indicate a frequency domain resource of the data.

Figure 1B:
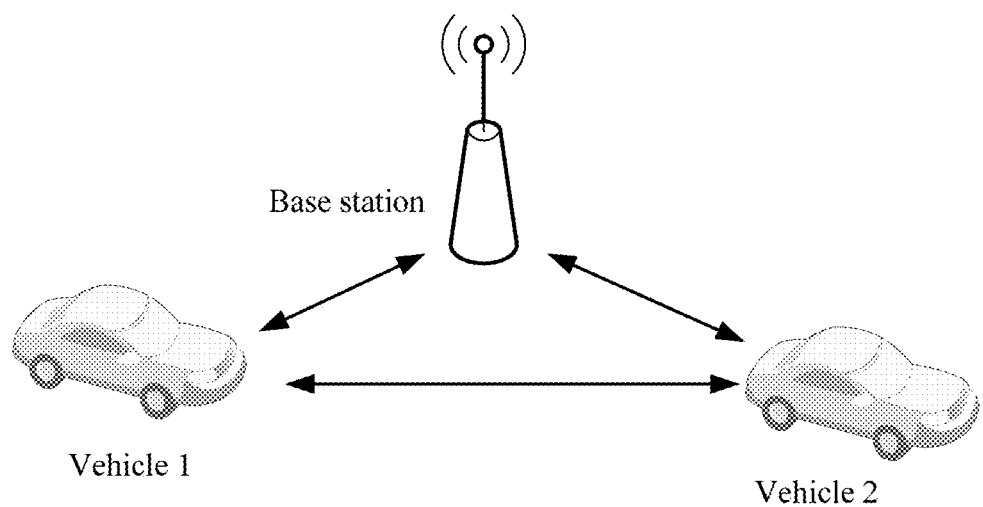
FIG. 1b is a network architectural diagram of V2V communication.

Referring to FIG. 1b, FIG. 1b is a network architectural diagram of V2V communication, including a vehicle 1, a vehicle 2, and a base station. In actual application, a plurality of vehicles are included in a coverage area of one base station. For ease of understanding, only two vehicles are used as an example in FIG. 1b. In the V2V communication, there are mainly two scenarios: in cell coverage (IC) and out of cell coverage (OOC). FIG. 1b describes a scenario of in cell coverage. In other words, the vehicle 1 and the vehicle 2 are within a coverage area of the base station. Out of cell coverage means that vehicles communicate with each other outside a coverage area of the base station. A vehicle in cell coverage detects a synchronization signal sent by the base station, obtains time-frequency synchronization and a cell ID, detects a physical broadcast channel (PBCH), obtains information such as bandwidth of a system, a quantity of antennas, a radio frame number, and physical hybrid automatic repeat request indicator channel (PHICH) configuration. Based on the information, the vehicle may perform control channel detection, periodically receive another broadcast message from the system, and perform normal communication transmission. In the V2V communication, the base station mainly performs transmission resource assignment, interference coordination, and the like. Before performing data transmission, the vehicle first applies to the base station for a transmission resource, and reports status information of the vehicle to the base station, and the base station allocates a corresponding resource to the vehicle based on the information reported by the vehicle. The V2V communication is also terminal-to-terminal communication, and therefore may be considered as a D2D communications technology.

However, not all D2D communications technologies are applicable to the V2V communication. For example, a method for indicating the SA time-frequency resource by the base station in the D2D communication is not applicable to the V2V communication. There are a plurality of multiplexing manners for the SA and the data in the V2V communication, and the multiplexing manner is used to describe a relationship between the time-frequency resource for transmitting the SA and the time-frequency resource for transmitting the data. For example, the multiplexing manner is used to indicate whether the SA and the data are transmitted in different subframes or in a same subframe, or the like. However, the plurality of multiplexing manners for the SA and the data do not exist in the D2D communication. Therefore, if the method for indicating the SA time-frequency resource by the base station in the D2D communication is still used in the V2V communication, a resource occupied to transmit SA information cannot be accurately indicated or obtained, and transmission performance is affected.

To resolve a problem that a transmission resource cannot be accurately indicated or obtained when there are a plurality of multiplexing manners, an embodiment of the present invention provides a scheduling assignment information transmission method, to consider the plurality of multiplexing manners, accurately indicate or obtain a resource occupied to transmit scheduling assignment information, and further improve transmission performance.

The scheduling assignment information transmission method provided in this embodiment of the present invention may be applied to a communication scenario in which there are a plurality of multiplexing manners, and the communication scenario may include but is not limited to an Internet of Vehicles scenario (a scenario of communication between a base station, a roadside unit, a motor vehicle, a non-motor vehicle, a pedestrian, and another communications device on a road). Further, this embodiment of the present invention may be further applied to an Internet of Things scenario, and specifically, may be applied to a scenario of communication between intelligent household appliances.

A user equipment in this embodiment of the present invention includes both the terminal described in FIG. 1a and an electronic device such as a motor vehicle, a non-motor vehicle, another communications device on a road, or an intelligent household appliance. A network device in this embodiment of the present invention may include but is not limited to a base station device, a roadside unit, and a network side device in future 5G communications.

It should be noted that in this embodiment of the present invention, the scheduling assignment information and SA are interchangeable, and data information and the data are interchangeable.

With reference to FIG. 2 to FIG. 7, the scheduling assignment information transmission method provided in this embodiment of the present invention is described in detail below.

Figure 2:
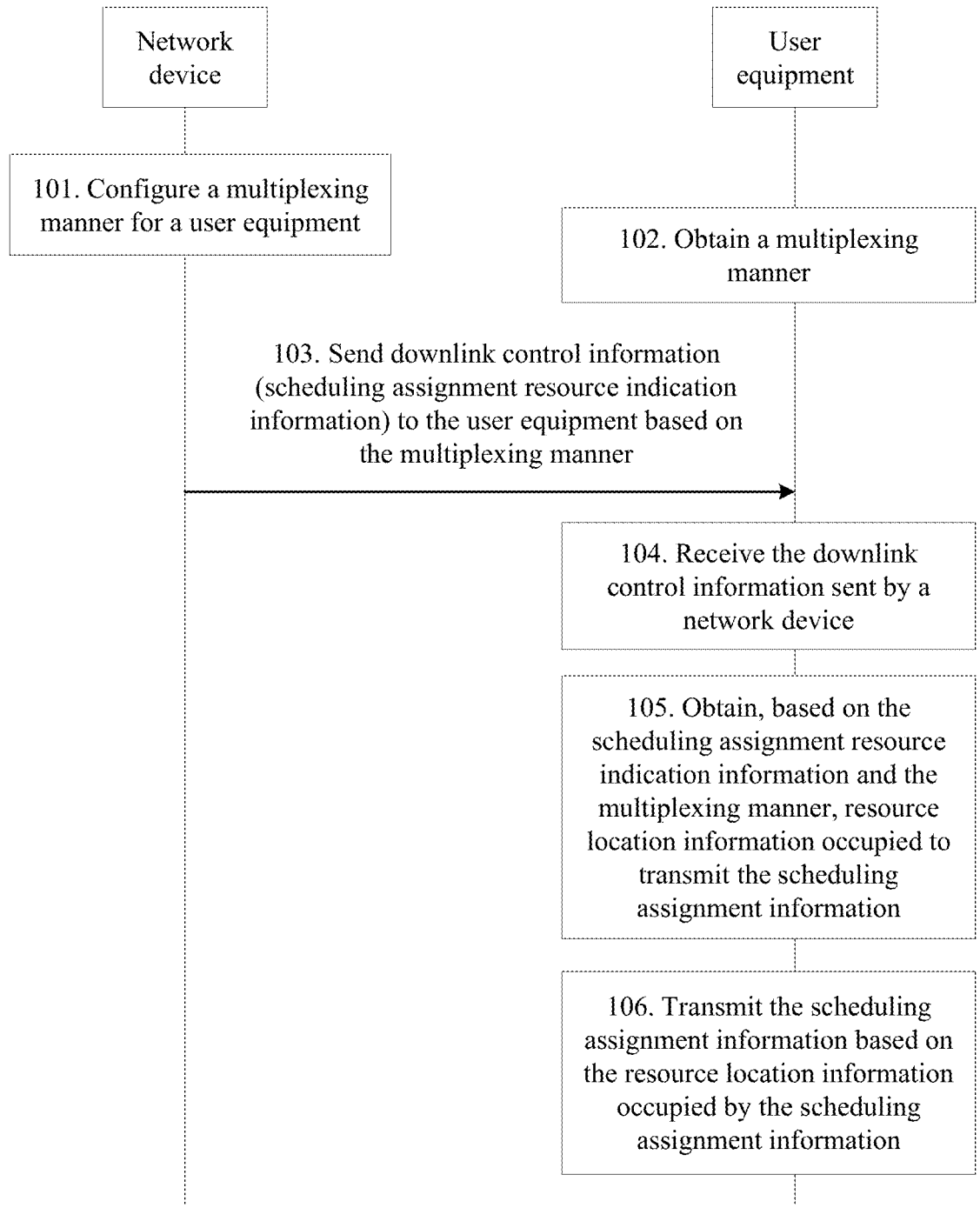
FIG. 2 is a schematic flowchart of a scheduling assignment information transmission method according to an embodiment of the present invention.

Referring to FIG. 2, FIG. 2 is a schematic flowchart of a scheduling assignment information transmission method according to an embodiment of the present invention. It should be noted that description is given by using transmission of one piece of scheduling assignment information as an example in this embodiment of the present invention. A same transmission method is used for each piece of scheduling assignment information, and the scheduling assignment information and data information are transmitted in pairs. A specific procedure of the scheduling assignment information transmission method is described from perspectives of both a user equipment and a network device in the embodiment shown in FIG. 2. The method may include the following steps.

101. The network device configures a multiplexing manner for the user equipment.

Figure 4:
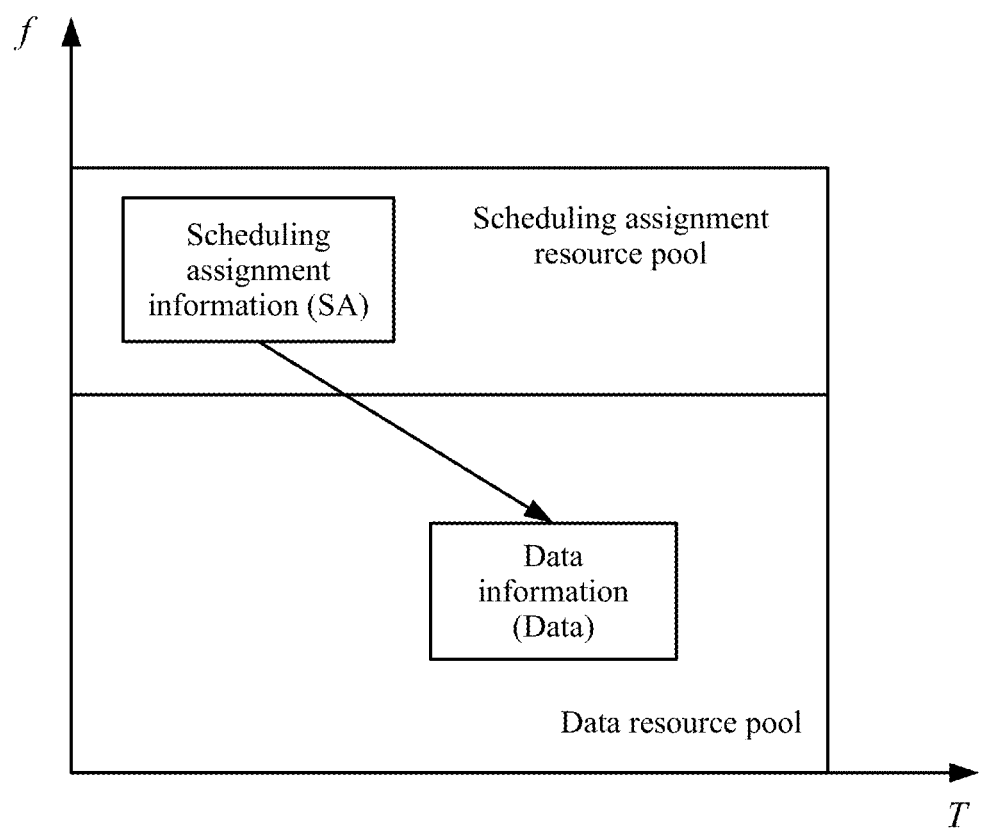
FIG. 4 is a schematic diagram of a time-frequency relationship in a first multiplexing manner according to an embodiment of the present invention.

Specifically, there are three multiplexing manners in V2V communication. The three multiplexing manners are used to describe a relationship between a time-frequency resource for transmitting scheduling assignment information and a time-frequency resource for transmitting data information. The three multiplexing manners include a first multiplexing manner shown in FIG. 4, a second multiplexing manner shown in FIG. 6, and a third multiplexing manner shown in FIG. 7. The first multiplexing manner is used to indicate that a time domain resource for transmitting the scheduling assignment information is different from a time domain resource for transmitting the data information. To be specific, the scheduling assignment information and the data information are transmitted in different subframes. A frequency domain resource of the scheduling assignment information may be adjacent or not adjacent to a frequency domain resource of the data information. In FIG. 4, time domain resources occupy different subframes, and frequency domain resources are not adjacent. The second multiplexing manner is used to indicate that a time domain resource for transmitting the scheduling assignment information is the same as a time domain resource for transmitting the data information, and a frequency domain resource for transmitting the scheduling assignment information is not adjacent to a frequency domain resource for transmitting the data information. To be specific, the scheduling assignment information and the data information are transmitted in a same subframe, and the frequency domain resource for transmitting the scheduling assignment information is not adjacent to the frequency domain resource for transmitting the data information. The third multiplexing manner is used to indicate that a time domain resource for transmitting the scheduling assignment information is the same as a time domain resource for transmitting the data information, and a frequency domain resource for transmitting the scheduling assignment information is adjacent to a frequency domain resource for transmitting the data information. To be specific, the scheduling assignment information and the data information are transmitted in a same subframe, and the frequency domain resource for transmitting the scheduling assignment information is adjacent to the frequency domain resource for transmitting the data information.

In an example, the network device configures the multiplexing manner for the user equipment by configuring different multiplexing manners for different resource pools. Specifically, the network device configures a plurality of resource pools, each resource pool includes a configuration parameter, and the configuration parameter includes an SA resource pool configuration parameter, a data resource pool configuration parameter, and a multiplexing manner configuration parameter. The multiplexing manner configuration parameter is used to indicate the multiplexing manner, and may indicate one or more multiplexing manners.

In a possible implementation, the network device notifies the user equipment of an identifier (for example, a sequence number, an ID, and a name) of a resource pool allocated to the user equipment. The user equipment uses the resource pool based on the identifier of the resource pool, and obtains a multiplexing manner configuration parameter corresponding to the resource pool, so as to obtain, based on the multiplexing manner configuration parameter, a multiplexing manner indicated by the multiplexing manner configuration parameter. The network device sends messages such as an RRC message, a MAC layer message, and a physical layer message to the user equipment, to notify the user equipment of the identifier of the resource pool allocated to the user equipment. It may be understood that the possible implementation is an explicit notification manner.

In another possible implementation, the network device sends DCI to the user equipment. The DCI includes data information resource indication information, and indicates a time-frequency resource location occupied to transmit the data information. When receiving the DCI, the user equipment obtains the time-frequency resource location occupied to transmit the data information, determines a used resource pool based on the time-frequency resource location occupied to transmit the data information, obtains a configuration parameter corresponding to the resource pool, and obtains a multiplexing manner configuration parameter from the configuration parameter, so as to obtain, based on the multiplexing manner configuration parameter, a multiplexing manner indicated by the multiplexing manner configuration parameter. It may be understood that the possible implementation is an implicit notification manner.

In an example, the network device configures the multiplexing manner for the user equipment by configuring different multiplexing manners for different cells. Specifically, the network device configures multiplexing manners for different cells in a coverage area. In a configuration process, one cell may be configured with one or more multiplexing manners, but resource pools in one cell have a same multiplexing manner. For example, a multiplexing manner of each resource pool in a cell 1 is the first multiplexing manner. The network device sends multiplexing indication information to the user equipment based on a cell accessed by the user equipment, so that the user equipment can obtain the multiplexing manner. The multiplexing indication information may include messages such as an RRC message, a MAC layer message, and a physical layer message.

In an example, the network device configures preconfiguration information for the user equipment, and the preconfiguration information indicates the multiplexing manner. Optionally, the preconfiguration information indicates the multiplexing manner by additionally adding an information element to a resource pool configuration parameter. Optionally, the preconfiguration information is notified to the user equipment by sending messages such as an RRC message, a MAC layer message, and a physical layer message to the user equipment.

The network device sends the multiplexing indication information or another message to the user equipment by using an air interface between the network device and the user equipment.

102. The user equipment obtains the multiplexing manner.

In an example, the user equipment receives the multiplexing indication information sent by the network device, and obtains the multiplexing manner based on the multiplexing indication information. The multiplexing indication information may include the messages such as the RRC message, the MAC layer message, and the physical layer message. The user equipment receives, by using the air interface between the user equipment and the network device, the multiplexing indication information sent by the network device.

In an example, the user equipment receives the messages such as the RRC message, the MAC layer message, and the physical layer message that are sent by the network device. The messages include the identifier of the resource pool allocated by the network device to the user equipment. The user equipment obtains, based on the identifier of the resource pool, the multiplexing manner configuration parameter corresponding to the resource pool, so as to obtain, based on the multiplexing manner configuration parameter, the multiplexing manner indicated by the multiplexing manner configuration parameter.

In an example, the user equipment receives the DCI sent by the network device. The DCI includes the data information resource indication information, and indicates the time-frequency resource location occupied to transmit the data information. The user equipment obtains the time-frequency resource location occupied to transmit the data information, determines the used resource pool based on the time-frequency resource location occupied to transmit the data information, obtains the configuration parameter corresponding to the resource pool, and obtains the multiplexing manner configuration parameter from the configuration parameter, so as to obtain, based on the multiplexing manner configuration parameter, the multiplexing manner indicated by the multiplexing manner configuration parameter.

In an example, the user equipment obtains the multiplexing manner based on the preconfiguration information, and the preconfiguration information is used to indicate the multiplexing manner. The preconfiguration information may be configured by the network device for the user equipment, or may be configured by a manufacturer of the user equipment for the user equipment before delivery. However, the preconfiguration information is on the user equipment. If the preconfiguration information is configured by the manufacturer, the multiplexing manner of the user equipment is fixed; or if the preconfiguration information is configured by the network device, the network device may change the multiplexing manner of the user equipment. Optionally, the preconfiguration information indicates the multiplexing manner by additionally adding an information element to the resource pool configuration parameter.

103. The network device sends downlink control information to the user equipment based on the multiplexing manner, where the downlink control information includes scheduling assignment resource indication information.

Specifically, the network device sends the downlink control information DCI to the user equipment based on the multiplexing manner and by using the air interface between the network device and the user equipment. The DCI includes the scheduling assignment resource indication information, and the scheduling assignment resource indication information is used to indicate resource location information occupied to transmit the scheduling assignment information. The scheduling assignment resource indication information indicates different resource location information based on different multiplexing manners, so that the scheduling assignment resource indication information is pertinent, and the resource location information indicated by the scheduling assignment resource indication information is more accurate, and closer to an actual application scenario.

If the multiplexing manner is the first multiplexing manner, the scheduling assignment resource indication information is used to indicate a time domain resource location and a frequency domain resource location that are occupied to transmit the scheduling assignment information. In a possible implementation, the scheduling assignment resource indication information includes scheduling assignment time domain resource indication information and scheduling assignment frequency domain resource indication information. The scheduling assignment time domain resource indication information is used to indicate the time domain resource location occupied to transmit the scheduling assignment information, and the scheduling assignment frequency domain resource indication information is used to indicate the frequency domain resource location occupied to transmit the scheduling assignment information. Alternatively, the scheduling assignment time domain resource indication information is used to indicate a relationship (for example, a subframe interval) between the time domain resource location occupied to transmit the scheduling assignment information and a time domain resource location occupied to transmit the data information, and the scheduling assignment time domain resource indication information is used to indicate a relationship (for example, a frequency offset) between the frequency domain resource location occupied to transmit the scheduling assignment information and a frequency domain resource location occupied to transmit the data information, so as to indirectly indicate, with reference to the data information resource indication information, the time domain resource location and the frequency domain resource location that are occupied to transmit the scheduling assignment information. In another possible implementation, the scheduling assignment resource indication information indicates both the time domain resource location and the frequency domain resource location that are occupied to transmit the scheduling assignment information, or indicates both the relationship between the time domain resource location occupied to transmit the scheduling assignment information and the time domain resource location occupied to transmit the data information, and the relationship between the time domain resource location occupied to transmit the scheduling assignment information and the time domain resource location occupied to transmit the data information.

If the multiplexing manner is the second multiplexing manner, the scheduling assignment resource indication information is used to indicate a frequency domain resource location occupied to transmit the scheduling assignment information. If the multiplexing manner is the third multiplexing manner, the scheduling assignment resource indication information is used to indicate a relationship between a frequency domain resource location occupied to transmit the scheduling assignment information and a frequency domain resource location occupied to transmit the data information. In the second multiplexing manner and the third multiplexing manner, because the time domain resource for transmitting the scheduling assignment information and the time resource for transmitting the data information occupy a same subframe, in other words, a time domain resource location occupied to transmit the scheduling assignment information is the same as a time domain resource location occupied to transmit the data information, the scheduling assignment resource indication information only needs to indicate the frequency domain resource location occupied to transmit the scheduling assignment information. Therefore, indication information redundancy can be avoided, and signaling overheads can be reduced.

104. The user equipment receives the downlink control information sent by the network device.

Specifically, the user equipment receives, by using the air interface between the user equipment and the network device, the downlink control information sent by the network device, and extracts the scheduling assignment resource indication information from the downlink control information.

105. The user equipment obtains, based on the scheduling assignment resource indication information and the multiplexing manner, resource location information occupied to transmit the scheduling assignment information.

In an example, when the multiplexing manner is the first multiplexing manner, the scheduling assignment resource indication information indicates the time domain resource location and the frequency domain resource location that are occupied to transmit the scheduling assignment information, and the user equipment may directly obtain, based on the scheduling assignment resource indication information and the first multiplexing manner, the time domain resource location and the frequency domain resource location that are occupied to transmit the scheduling assignment information.

In an example, when the multiplexing manner is the second multiplexing manner, the scheduling assignment resource indication information indicates the frequency domain resource location occupied to transmit the scheduling assignment information, and does not indicate the time domain resource location occupied to transmit the scheduling assignment information. Therefore, the user equipment needs to obtain the time domain resource location occupied to transmit the scheduling assignment information. The downlink control information includes data resource indication information in addition to the scheduling assignment resource indication information. The data resource indication information includes a T-RPT field and an RA field. The T-RPT field indicates the time domain resource location occupied to transmit the data information, and the RA field indicates a frequency domain resource location occupied to transmit the data information. The user equipment obtains, based on the data resource indication information, the time domain resource location occupied to transmit the data information. Because the scheduling assignment information and the data information are transmitted in a same subframe, the user equipment determines that the time domain resource location occupied to transmit the data information is the time domain resource location occupied to transmit the scheduling assignment information. The user equipment obtains, based on the second multiplexing manner and the scheduling assignment resource indication information, the frequency domain resource location occupied to transmit the scheduling assignment information.

In an example, when the multiplexing manner is the third multiplexing manner, the scheduling assignment resource indication information indicates the relationship between the frequency domain resource location occupied to transmit the scheduling assignment information and the frequency domain resource location occupied to transmit the data information. The relationship between the frequency domain resource locations may indicate that the scheduling assignment information is transmitted on a side of the data information, or may be transmitted on another side of the data information. However, neither the frequency domain resource location occupied to transmit the scheduling assignment information nor the time domain resource location occupied to transmit the scheduling assignment information is clearly indicated. Therefore, the user equipment needs to obtain the time frequency resource location and the frequency domain resource location that are occupied to transmit the scheduling assignment information. The downlink control information includes data resource indication information in addition to the scheduling assignment resource indication information. The data resource indication information includes a T-RPT field and an RA field. The T-RPT field indicates the time domain resource location occupied to transmit the data information, and the RA field indicates the frequency domain resource location occupied to transmit the data information. The user equipment obtains, based on the data resource indication information, the time domain resource location and the frequency domain resource location that are occupied to transmit the data information. Because the scheduling assignment information and the data information are transmitted in a same subframe, the user equipment determines that the time domain resource location occupied to transmit the data information is the time domain resource location occupied to transmit the scheduling assignment information. The user equipment obtains, based on the third multiplexing manner and the relationship between the frequency domain resource locations that is indicated by the scheduling assignment resource indication information, the frequency domain resource location occupied to transmit the scheduling assignment information.

For the second multiplexing manner and the third multiplexing manner, because the time domain resource location occupied to transmit the data information is the same as the time domain resource location occupied to transmit the scheduling assignment information, indication information used to indicate the time domain resource location occupied to transmit the scheduling assignment information does not need to be configured in the downlink control information. Therefore, indication information redundancy can be avoided, and signaling overheads can be reduced.

The downlink control information further includes transmission quantity indication information, the transmission quantity indication information is used to indicate that a quantity of transmission times of the scheduling assignment information is at least one time, and the scheduling assignment resource indication information is used to indicate resource location information occupied to transmit the scheduling assignment information each of the at least one time, so as to more accurately indicate the resource location information occupied to transmit the scheduling assignment information. In D2D communication, the scheduling assignment information is permanently transmitted for two times, and data is permanently transmitted for four times. In the V2V communication, data is not permanently transmitted for four times, and a quantity of transmission times of the data is changeable, for example, two times, six times, or eight times. Correspondingly, the scheduling assignment information may be transmitted for a same quantity of times as the data, and the quantity of transmission times of the scheduling assignment information is also not permanently two times. Because the scheduling assignment information and the data have a same quantity of transmission times, the transmission quantity indication information may be transmission quantity indication information of the scheduling assignment information, or may be transmission quantity indication information of the data. Only one piece of the transmission quantity indication information is required, to avoid information redundancy. Therefore, the scheduling assignment resource indication information needs to clearly indicate the resource location information occupied to transmit the scheduling assignment information each time.

106. The user equipment transmits the scheduling assignment information based on the resource location information occupied by the scheduling assignment information.

Specifically, after the time domain resource location and the frequency domain resource location that are occupied to transmit the scheduling assignment information are determined, the user equipment transmits the scheduling assignment information by using the time domain resource location and the frequency domain resource location that are occupied by the scheduling assignment information and a transmission interface between user equipments. To be specific, the scheduling assignment information is transmitted to other user equipment, so that data information transmission can be performed between the two user equipments, and direct communication can be performed between the two user equipments.

In this embodiment of the present invention, the network device configures the multiplexing manner for the user equipment, and sends, based on the multiplexing manner, the downlink control information that includes the scheduling assignment resource indication information to the user equipment; the user equipment obtains the multiplexing manner, receives the downlink control information that includes the scheduling assignment resource indication information and that is sent by the network device, obtains, based on the scheduling assignment resource indication information and the multiplexing manner, the resource location information occupied to transmit the scheduling assignment information, and transmits the scheduling assignment information based on the resource location information occupied by the scheduling assignment information, so that a resource occupied to transmit the scheduling assignment information can be accurately indicated or obtained, and transmission performance can be further improved.

A time-frequency resource location occupied by scheduling assignment information is described in detail below with reference to FIG. 3 to FIG. 7.

Figure 3:
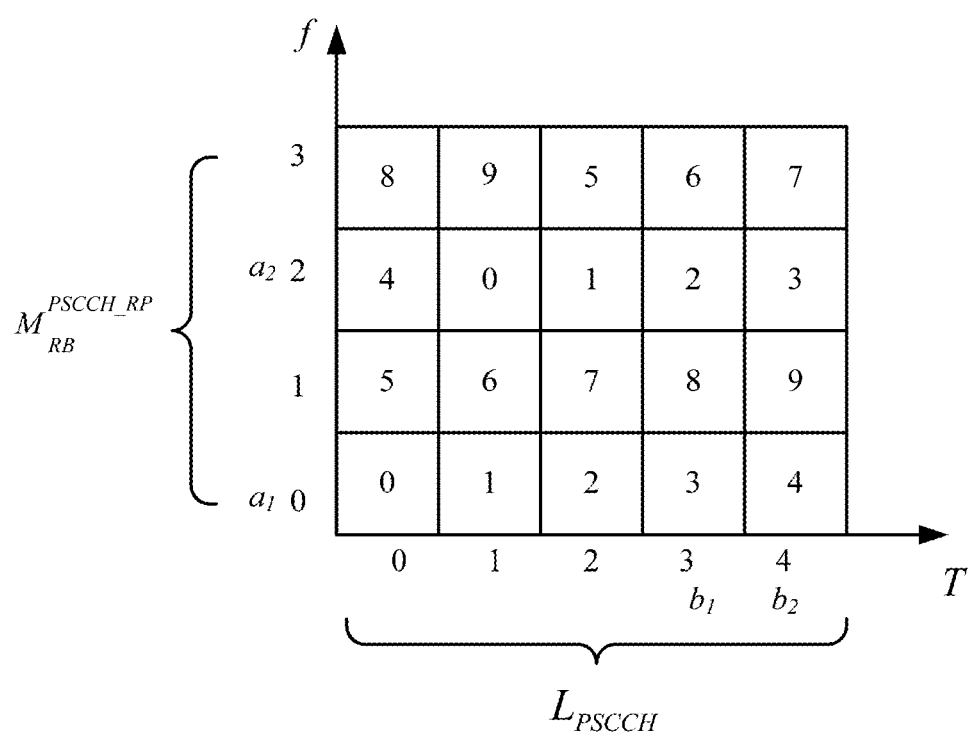
FIG. 3 is a schematic diagram of a time-frequency resource location of scheduling assignment information in D2D communication.

Referring to FIG. 3, FIG. 3 is a schematic diagram of a time-frequency resource location of scheduling assignment information in D2D communication. It should be noted that the schematic diagram of the time-frequency resource location shown in FIG. 3 is merely used as an example for description, and does not constitute a limitation on the embodiments of the present invention. In the D2D communication, SA is permanently transmitted for two times, and data is permanently transmitted for four times. In FIG. 3, $L_{PSCCH}$ represents a time domain length (a quantity of subframes) of an SA resource pool, $M_{RB}^{PSCCH\_RP}$ represents a frequency domain length of the SA resource pool, and a frequency domain length unit is a resource block (RB). These two parameters may be learned by a user equipment in advance. A specific learning manner is not limited herein, and no example is used for the learning manner. When $0 \leq n_{PSCCH} < \lfloor M_{RB}^{PSCCH\_RP}/2 \rfloor \cdot L_{PSCCH}$, a time-frequency resource location occupied by the SA is obtained through calculation by using the following formulas:

$$a_1 = \lfloor n_{PSCCH}/L_{PSCCH} \rfloor,$$

$$b_1 = n_{PSCCH} \bmod L_{PSCCH},$$

$$a_2 = \lfloor n_{PSCCH}/L_{PSCCH} \rfloor + \lfloor M_{RB}^{PSCCH\_RP}/2 \rfloor, \text{ and}$$

$$b_2 = (n_{PSCCH} + 1 + \lfloor n_{PSCCH}/L_{PSCCH} \rfloor \bmod(L_{PSCCH}-1)) \bmod L_{PSCCH}, \text{ where}$$

PSCCH is a physical sidelink control channel (PSCCH). $n_{PSCCH}$ represents a value indicated by an index field. For the two times of transmission, frequency domain resource locations are respectively $a_1$ and $a_2$, and time domain resource locations are respectively $b_1$ and $b_2$. Assuming that the time domain length $L_{PSCCH}=5$, and the frequency domain length $M_{RB}^{PSCCH\_RP}=4$, a value range that can be indicated by the index field is 0 to 9. For the value indicated by the index field and the time-frequency resource location corresponding to the SA, refer to FIG. 3. A digit shown in each grid in FIG. 3 is the value indicated by the index field. It can be seen from FIG. 3 that there is translation between a first row and a third row, and the third row may be obtained by translating digits in the first row rightward by one grid; and there is translation between a second row and a fourth row, and the fourth row may be obtained by translating digits in the first row rightward by two grids. Therefore, the first row and the second row may be represented as a time-frequency resource location occupied for the first SA transmission, and the third row and the fourth row may be represented as a time-frequency resource location occupied for second SA transmission.

Assuming that a value indicated by an index field received by the user equipment is 3, the following may be obtained through calculation according to the foregoing formulas: $a_1=0$, $b_1=3$, $a_2=2$, and $b_2=4$. To be specific, a frequency domain resource occupied for one time of SA transmission is an RB 0, namely, $a_1$ in FIG. 3, and a time domain resource is a subframe 3, namely, $b_1$ in FIG. 3; and a frequency domain resource occupied for the other time of SA transmission is an RB 2, namely, $a_2$ in FIG. 3, and a time domain resource is a subframe 4, namely, $b_2$ in FIG. 3.

Based on a first multiplexing manner shown in FIG. 4, a resource location occupied by the scheduling assignment information is described below by using an example in which a quantity of transmission times is 1, 2, or 4.

When the quantity of transmission times is 1, a manner of indicating the SA time-frequency resource location in the D2D communication is still used, but only a time-frequency resource for one time of SA transmission is used. For example, a time-frequency resource location indicated by $a_1$ and $b_1$ is used. Specifically, when learning the value indicated by the index field and learning that the quantity of transmission times is 1, the user equipment calculates, according to the foregoing formulas, the frequency domain resource locations $a_1$ and $a_2$ and the time domain resource locations $b_1$ and $b_2$ that are occupied for the two times of SA transmission. However, the SA is transmitted only on an SA resource indicated by $a_1$ and $b_1$, or the SA is transmitted only on an SA resource indicated by $a_2$ and $b_2$. In a manner of determining an SA resource to be used, the SA resource may be indicated in DCI, for example, by using one bit; or may be indicated by using an independent field in DCI; or may be indicated by extending scheduling assignment resource indication information. In another manner, the SA resource may be indicated by using RRC signaling, for example, RRC dedicated signaling or a system message. Likewise, indication information may be added to the RRC signaling. For example, the SA resource may be indicated by using one bit. In a possible implementation, when the indication information is 0, an SA resource whose subscript is 1 is indicated; and when the indication information is 1, an SA resource whose subscript is 2 is indicated. After learning the indication information, the user equipment may calculate only a time domain resource location and a frequency domain resource location of a required SA resource. For example, when learning that the SA resource whose subscript is 1 is used, the user equipment only calculates $a_1$ and $b_1$ by using the value indicated by the index field, and does not need to calculate $a_2$ and $b_2$.

When the quantity of transmission times is 2, a manner of indicating the SA time-frequency resource location in the D2D communication is still used. Specifically, when learning the value indicated by the index field and leaning that the quantity of transmission times is 2, the user equipment calculates, according to the foregoing formulas, the frequency domain resource locations $a_1$ and $a_2$ and the time domain resource locations $b_1$ and $b_2$ that are occupied for the two times of SA transmission, and transmits the SA on these two SA resources. It should be noted that two RBs may be occupied for one time of SA transmission in frequency domain in V2V communication, and two RBs may be used as a basic unit to redivide the SA resource pool. A frequency domain parameter in the formulas needs to be interpreted by using two RBs as a basic unit. For example, $M_{RB}^{PSCCH\_RP}$ represents a quantity of basic units (two RBs) in frequency domain instead of a quantity of RBs in the SA resource pool in frequency domain. The frequency domain resource locations indicated by $a_1$ and $a_2$ for the two times of transmission also need to be interpreted by using two RBs as a granularity.

Figure 5A:
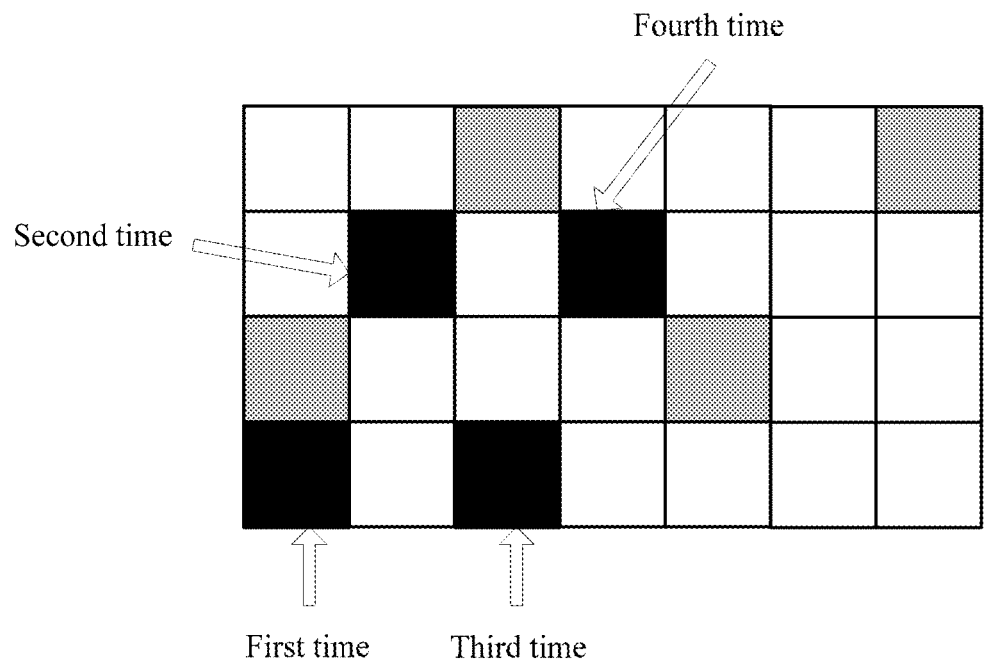
FIG. 5a is a schematic diagram of a time-frequency resource location in a first multiplexing manner.

When the quantity of SA transmission times is 4, time-frequency resources for the four times of transmission are obtained by extending an indication manner of the two times of SA transmission. Specifically, when learning the value indicated by the index field and learning that the quantity of transmission times is 4, the UE calculates, in the following manners, frequency domain resource locations $a_1$-$a_4$ and time domain resource locations $b_1$-$b_4$ for the four times of SA transmission, and transmits the SA on these resources. Specific extension manners are as follows:

Manner 1: Referring to FIG. 5a, FIG. 5a is a schematic diagram of a time-frequency resource location in the first multiplexing manner. Uniform space translation is performed on time-frequency resource locations for the two times of transmission in time domain, so as to obtain time-frequency resource locations for the other two times of transmission. For example, black grids in FIG. 5a respectively represent resources occupied for four times of SA transmission. Resources occupied for first two times of transmission are resources occupied for the two times of transmission. A frequency domain resource occupied for the third transmission is the same as that occupied for the first transmission, and a frequency domain resource occupied for the fourth transmission is the same as that occupied for the second transmission. There is a difference of one subframe between every two resources in time domain (there is a difference of one subframe between a time domain resource occupied for the third transmission and a time domain resource occupied for the first transmission, and there is a difference of one subframe between a time domain resource occupied for the fourth transmission and a time domain resource occupied for the second transmission). Grey grids are similar, and there is a difference of three subframes between resources in time domain.

Formulas of calculating time-frequency resource locations for last two times of transmission are as follows:

$a_3 = a_1$ $b_3 = (2b_2 - b_1) \bmod L_{PSCCH}$ $a_4 = a_2$ $b_4 = (2b_3 - b_2) \bmod L_{PSCCH} = (3b_2 - 2b) \bmod L_{PSCCH}$ Advantages of this manner are relative simplicity and slight change.

Figure 5B:
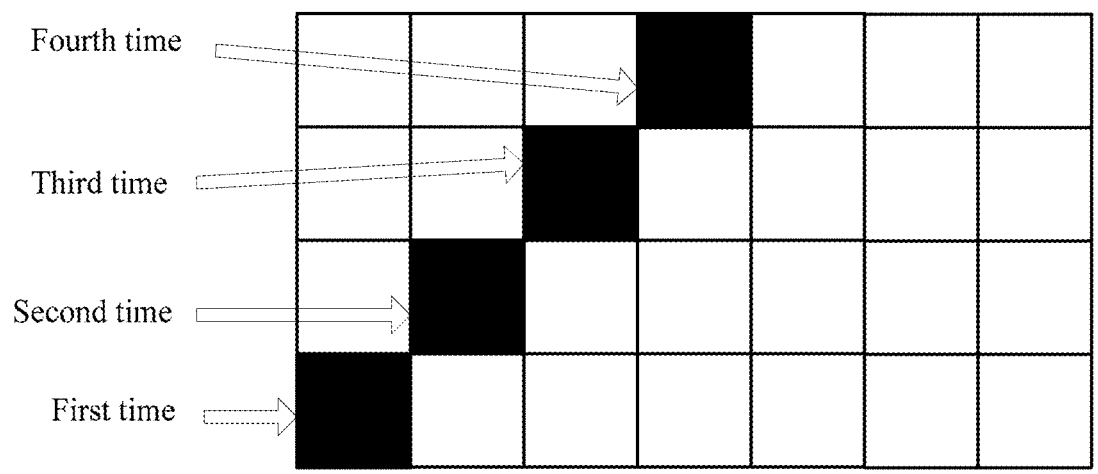
FIG. 5b is a schematic diagram of another time-frequency resource location in a first multiplexing manner.

Manner 2: Referring to FIG. 5b, FIG. 5b is a schematic diagram of another time-frequency resource location in the first multiplexing manner. Uniform space translation is performed on a time-frequency resource location for the first of the two times of transmission in time domain and frequency domain, so as to obtain time-frequency resource locations for the other three times of transmission. For example, black grids in FIG. 5b respectively represent resources for the four times of SA transmission. A resource for the first transmission is a resource for the first of the two times of transmission, and there is a difference of one between time-frequency resource locations for every two times of subsequent transmission.

When $0 \leq n_{PSCCH} < \lfloor M_{RB}^{PSCCH\_RP}/4 \rfloor \cdot L_{PSCCH}$, formulas of calculating time-frequency resource locations for the four times of SA transmission are as follows:

$a_1' = a_1$, $b_1' = b_1$, $a_2' = a_1' + \lfloor M_{RB}^{PSCCH\_RP}/4 \rfloor$, $b_2' = b_2$, $a_3' = 2a_2' - a_1'$, $b_3' = (2b_2' - b_1') \bmod L_{PSCCH}$, $a_4' = 2a_3' - a_2'$, and $b_4' = (2b_3' - b_2') \bmod L_{PSCCH}$, where $a_1'$-$a_4'$ and $b_1'$-$b_4'$ respectively represent frequency domain resource locations and time domain resource locations occupied for the four times of transmission. However, $a_1$ and $a_2$, and $b_1$ and $b_2$ respectively represent the frequency domain resource locations and the time domain resource locations occupied for the two times of transmission in the D2D communication.

In comparison with Manner 1, an advantage of Manner 2 is that even if two UEs whose quantities of SA transmission times are respectively 2 and 4 select same SA resource indication information, a problem that all resources collide does not occur. It is assumed that SA of a user equipment 1 is transmitted for two times, and SA of a user equipment 2 is transmitted for four times. When the two user equipments have same SA resource indication information:

1. According to Manner 1, SA resources used for the two times of transmission of the user equipment 1 are completely the same as SA resources used for first two times of transmission of the user equipment 2, and a resource collision occurs.

2. According to Manner 2, the foregoing resource collision problem does not occur.

Figure 5C:
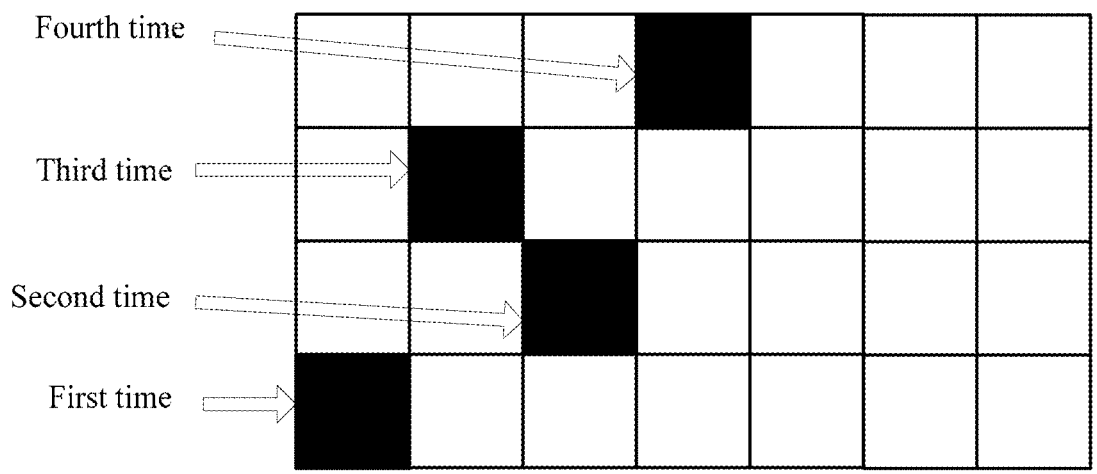
FIG. 5c is a schematic diagram of still another time-frequency resource location in a first multiplexing manner.

Manner 3: Referring to FIG. 5c, FIG. 5c is a schematic diagram of still another time-frequency resource location in the first multiplexing manner. It is assumed that time domain resources for the second transmission and the third transmission in Manner 2 are unchanged, and frequency domain resources are exchanged with each other.

When $0 \leq n_{PSCCH} < \lfloor M_{RB}^{PSCCH\_RP}/4 \rfloor \cdot L_{PSCCH}$, formulas of calculating time-frequency resource locations for the four times of SA transmission are as follows:

$a_1' = a_1$, $b_1' = b_1$, $a_2' = a_2$, $b_2' = b_2$, $a_3' = a_1' + \lfloor M_{RB}^{PSCCH\_RP}/4 \rfloor$, $b_3' = (2b_2' - b_1') \bmod L_{PSCCH}$, $a_4' = a_2' + \lfloor M_{RB}^{PSCCH\_RP}/4 \rfloor$, and $b_4' = (2b_3' - b_2') \bmod L_{PSCCH}$, where $a_1'$-$a_4'$ and $b_1'$-$b_4'$ respectively represent frequency domain resource locations and time domain resource locations occupied for the four times of transmission. However, $a_1$ and $a_2$, and $b_1$ and $b_2$ respectively represent the frequency domain resource locations and the time domain resource locations occupied for the two times of transmission in the D2D communication.

In comparison with Manner 1, an advantage of Manner 3 is that both quantities of SA transmission times of two user equipments are 4, but the two user equipments select different SA resource indication information, and certainly no resource collision occurs. It is assumed that both SA of a user equipment 1 and SA of a user equipment 2 are transmitted for four times. When the two user equipments have different SA resource indication information:

1. According to Manner 1, a same resource may still be used for two times of SA transmission of the user equipment 1 and the user equipment 2, and a collision occurs. For example, a resource used for the third SA transmission and the fourth SA transmission of the user equipment 1 is the same as a resource used for the first SA transmission and the second SA transmission of the user equipment 2.

2. According to Manner 3, the foregoing resource collision problem does not occur.

Figure 5D:
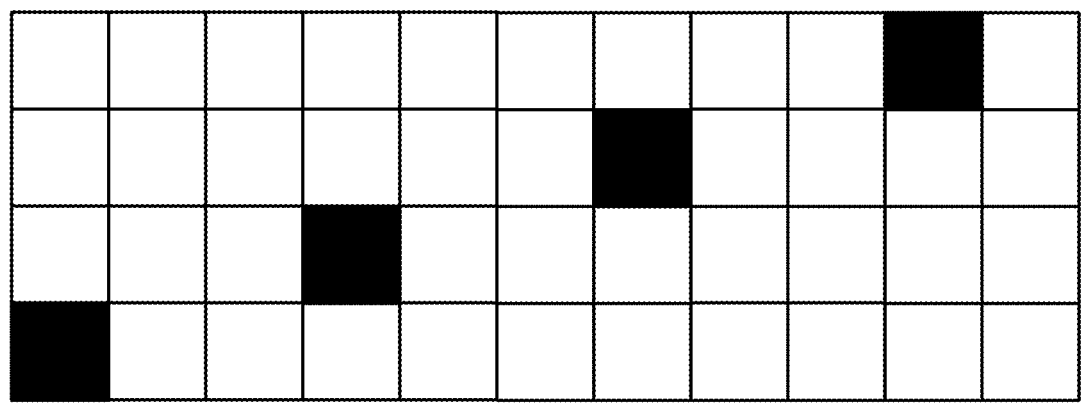
FIG. 5d is a schematic diagram of yet another time-frequency resource location in a first multiplexing manner.

Manner 4: Referring to FIG. 5d, FIG. 5d is a schematic diagram of yet another time-frequency resource location in the first multiplexing manner. Different time domain transmission intervals are allocated to different quantities of transmission times. For example, time domain intervals may be 1 or 2 for two times of transmission, and time domain intervals may be 3 for four times of transmission.

When $0 \leq n_{PSCCH} < \lfloor M_{RB}^{PSCCH\_RP}/4 \rfloor \cdot L_{PSCCH}$, formulas of calculating time-frequency resource locations for the four times of SA transmission are as follows:

$a_1'=a_1$, $b_1'=b_1$, $a_2'=a_1'+\lfloor M_{RB}^{PSCCH\_RP}/4 \rfloor$, $b_2'=(n_{PSCCH}+\text{offset}+\lfloor n_{PSCCH}/L_{PSCCH} \rfloor L \mod(L_{PSCCH}-1))\mod L_{PSCCH}$, $a_3'=2a_2'-a_1'$, $b_3'=(2b_2'-b_1')\mod L_{PSCCH}$, $a_4'=2a_3'-a_2'$, and $b_4'=(2b_3'-b_2')\mod L_{PSCCH}$, where offset represents an offset, and is a positive integer not less than 1; $a_1'$-$a_4'$ and $b_1'$-$b_4'$ respectively represent frequency domain resource locations and time domain resource locations occupied for the four times of transmission; and $a_1$ and $a_2$ and $b_1$ and $b_2$ respectively represent the frequency domain resource locations and the time domain resource locations occupied for the two times of transmission in the D2D communication.

In comparison with Manner 1, Manner 2, and Manner 3, an advantage of Manner 4 is that even if two user equipments whose quantities of SA transmission times are respectively 2 and 4 select same SA resource indication information, no half-duplex problem occurs, and consequently, a user equipment whose quantity of transmission times is 4 completely receives no SA of a user equipment whose quantity of transmission times is 2. It is assumed that SA of a user equipment 1 is transmitted for four times, and SA of a user equipment 2 is transmitted for two times. When the two user equipments have same SA resource indication information:

1. According to Manner 1, Manner 2, and Manner 3, a same time domain resource is used for first two times of transmission of the user equipment 1 and two times of transmission of the user equipment 2. Because a user equipment cannot perform sending and receiving at a same moment, the user equipment 1 misses two times of SA transmission of the user equipment 2.

2. According to Manner 4, the foregoing half-duplex problem does not occur. The user equipment whose quantity of transmission times is 4 has at least one opportunity to receive SA of the user equipment whose quantity of transmission times is 2.

Figure 5E:
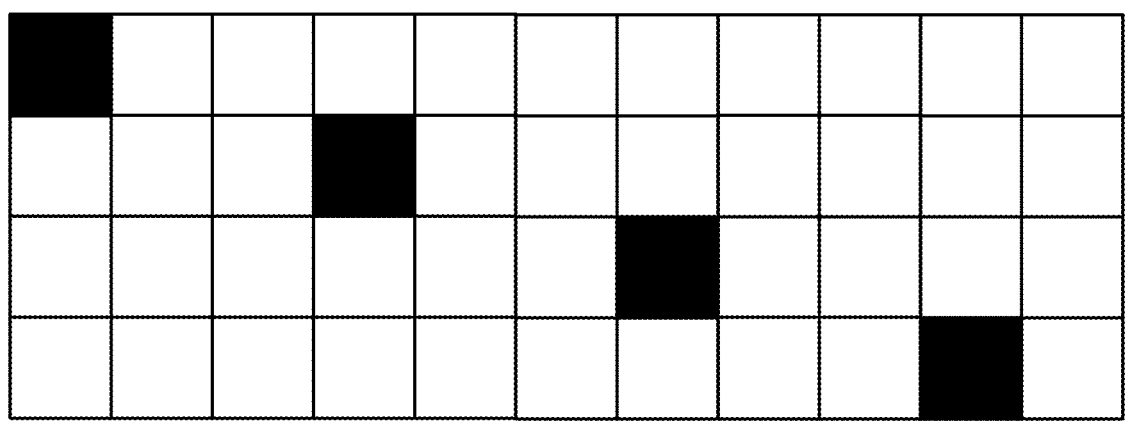
FIG. 5e is a schematic diagram of still yet another time-frequency resource location in a first multiplexing manner.

Manner 5: It is assumed that during all times of transmission in Manner 1 to Manner 4, time domains are unchanged and frequency domains are symmetric. Manner 4 is used as an example. Referring to FIG. 5e, FIG. 5e is a schematic diagram of still yet another time-frequency resource location in the first multiplexing manner.

Formulas of calculating time-frequency resource locations for the four times of SA transmission are as follows:

$a_1''=M_{RB}^{PSCCH\_RP}-1-a_1'$, $b_1''=b_1'$, $a_2''=M_{RB}^{PSCCH\_RP}-1-a_2'$, $b_2''=b_2'$, $a_3''=M_{RB}^{PSCCH\_RP}-1-a_3'$, $b_3''=b_3'$, $a_4''=M_{RB}^{PSCCH\_RP}-1-a_4'$, and $b_4''=b_4'$, where $a_1'$-$a_4'$ and $b_1'$-$b_4'$ respectively represent frequency domain resource locations and time domain resource locations for the four times of transmission in Manner 1 to Manner 4. However, $a_1''$-$a_4''$ and $b_1''$-$b_4''$ respectively represent frequency domain resource locations and time domain resource locations for the four times of transmission in Manner 5.

Figure 6:
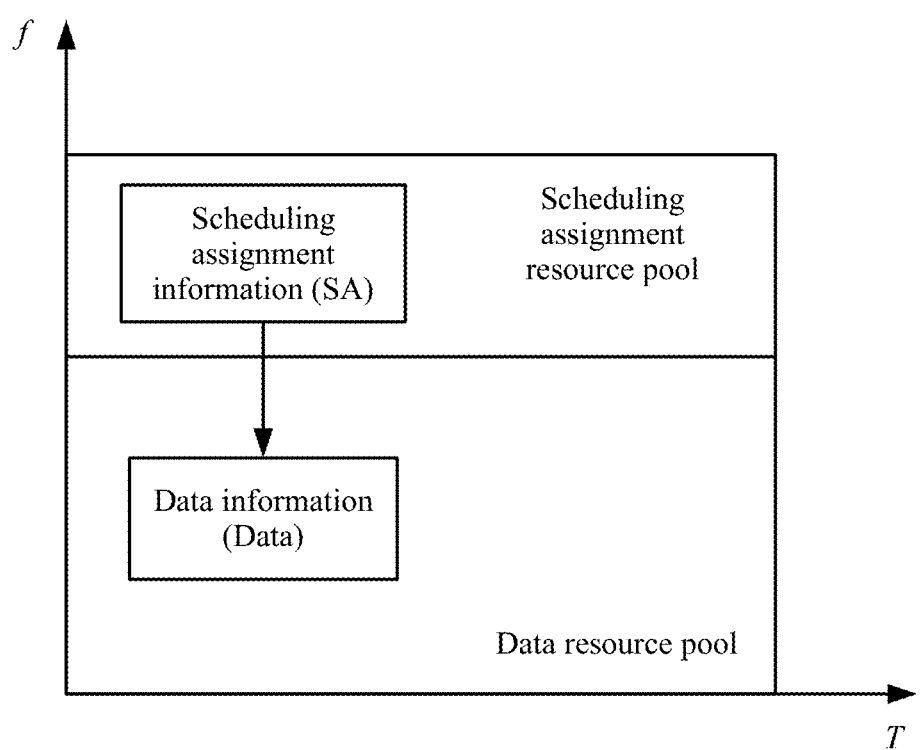
FIG. 6 is a schematic diagram of a time-frequency relationship in a second multiplexing manner according to an embodiment of the present invention.

Based on a second multiplexing manner shown in FIG. 6, a resource location occupied by the scheduling assignment information is described below by using an example in which a quantity of transmission times is 1, 2, or 4.

Manner 1: SA resource indication information in the first multiplexing manner shown in FIG. 4 is reused, but only frequency domain resource information in the SA resource indication information is used. Specifically, the SA resource indication information in the first multiplexing manner shown in FIG. 4 indicates a time domain resource location and a frequency domain resource location that are occupied to transmit the SA. It is only considered herein that the frequency domain resource location information in the SA resource indication information is meaningful, and time domain resource location information is ignored. For example, the SA is transmitted for four times, and a resource indicated by the SA resource indication information is shown in the following figure. Time domain resource locations are a zeroth time domain resource, a first time domain resource, a second time domain resource, and a third time domain resource, and frequency domain resource locations are a zeroth frequency domain resource, a second frequency domain resource, a first frequency domain resource, and a third frequency domain resource. The user equipment uses only the frequency domain resource location information, determines that frequency domain resource locations for the four times of SA transmission are the zeroth frequency domain resource, the second frequency domain resource, the first frequency domain resource, and the third frequency domain resource, and ignores the time domain resource location information.

An advantage of Manner 1 is simplicity, and the SA resource indication information in the first multiplexing manner shown in FIG. 4 is directly reused without needing to make any change to the information. There are only some differences when the user equipment interprets the information.

Manner 2: Redefine SA resource indication information, so that the SA resource indication information indicates only frequency domain resource information.

(1) There is a fixed relationship between frequency domain resources for all times of transmission. In other words, when a frequency domain resource for first transmission is determined, a frequency domain resource for subsequent transmission is determined accordingly. In a possible implementation, there is a fixed interval between frequency domain resources for every two times of transmission. It is assumed that there are four SA resources in frequency domain, the SA is transmitted for four times, and the SA resources are respectively denoted as the zeroth SA resource, the first SA resource, the second SA resource, and the third SA resource. When the interval is 0, a frequency domain resource used for each time of transmission is the same as a frequency domain resource used for first transmission. For example, the second SA resource is used for the first transmission, and therefore the second SA resource is also used for the second transmission, the third transmission, and the fourth transmission. When the interval is 1, a resource location used for each time of transmission is obtained by adding one to a resource location for previous transmission. When a resource location goes beyond a range, a cycle is repeated. For example, the second SA resource is used for the first transmission, and therefore the third SA resource, the zeroth SA resource, and the first SA resource are used for the second transmission, the third transmission, and the fourth transmission. Four times of transmission are used as an example in the foregoing description. A case in which there is another quantity of transmission times is similar. For example, when the quantity of transmission times is 2, only frequency domain resource locations for the first transmission and the second transmission and the interval need to be considered.

Because there is a fixed relationship between frequency domain resource locations for all times of transmission, a frequency domain resource location for subsequent transmission is determined by a frequency domain resource location for first transmission. In this case, the SA resource indication information only needs to indicate the frequency domain resource location for the first transmission. For example, when the SA resource indication information is 0, it indicates that a zeroth frequency domain resource is used for the first transmission; and when the SA resource indication information is 1, it indicates that a first frequency domain resource is used.

(2) There is no fixed relationship between frequency domain resources for all times of transmission. In other words, any frequency domain resource may be used for each time of transmission. It is assumed that there are M SA resources in each subframe, the SA needs to be transmitted for K times, an $(s_i)^{th}$ resource is selected for $i^{th}$ transmission, i=0, 1, ..., K−1, and $s_i$=0, 1, ..., M−1. In a first possible implementation, the SA resource indication information is defined as $$\sum_{i=0}^{K-1} s_i M^i.$$

For example, assuming that there are three SA resources (M=3) in each subframe, the SA needs to be transmitted for four times (K=4), and a zeroth resource, a first resource, a second resource, and a second resource ($s_0$=0, $s_1$=1, $s_2$=2, $s_3$=2) are respectively selected for the first transmission to the fourth transmission, the SA resource indication information is $0·3^0+1·3^1+2·3^2+2·3^3$=75. A network device sends the information to the user equipment. After receiving the information, the user equipment may calculate, based on the information, K, and M, a frequency domain resource location for each time of transmission. The following steps may be used:

(i) $\lfloor 75/3^3 \rfloor$=2, and therefore the second resource ($s_3$) is used for the fourth transmission, and 75 mod $3^3$=21;

(ii) $\lfloor 21/3^2 \rfloor$=2, and therefore the second resource ($s_2$) is used for the third transmission, and 21 mod $3^2$=3;

(iii) $\lfloor 3/3^1 \rfloor$=1, and therefore the first resource ($s_1$) is used for the second transmission, and 3 mod $3^1$=0; and (iv) $\lfloor 0/3^0 \rfloor$=0, and therefore the zeroth resource ($s_0$) is used for the first transmission.

When the quantity of transmission times is 2, the step (iii) and the step (iv) are used; or when the quantity of transmission times is 1, only the step (iv) is used, and so on.

In another possible implementation, the SA resource indication information is defined as $$\sum_{i=0}^{K-1} s_i M^{K-1-i}.$$

For example, assuming that there are three SA resources (M=3) in each subframe, the SA needs to be transmitted for four times (K=4), and a zeroth resource, a first resource, a second resource, and a second resource ($s_0$=0, $s_1$=1, $s_2$=2, $s_3$=2) are respectively selected for the first transmission to the fourth transmission, the SA resource indication information is $0·3^3+1·3^2+2·3^1+2·3^0$=17. A network device sends the information to the user equipment. After receiving the information, the user equipment may calculate, based on the information, K, and M, a frequency domain resource location for each time of transmission. The following steps may be used:

(i) $\lfloor 17/3^3 \rfloor$=0, and therefore the zeroth resource ($s_0$) is used for the first transmission, and 17 mod $3^3$=17;

(ii) $\lfloor 17/3^2 \rfloor$=1, and therefore the first resource ($s_1$) is used for the second transmission, and 17 mod $3^2$=8;

(iii) $\lfloor 8/3^1 \rfloor$=2, and therefore the second resource ($s_2$) is used for the third transmission, and 2 mod $3^1$=2; and (iv) $\lfloor 2/3^0 \rfloor$=2, and therefore the second resource ($s_3$) is used for the fourth transmission.

When the quantity of transmission times is 2, the step (i) and the step (ii) are used; or when the quantity of transmission times is 1, only the step (i) is used, and so on.

In DCI in the D2D communication, an index field is six bits, may support a maximum of 64 ($2^6$) different possibilities, and may indicate a maximum of 64 different values. However, it is noted that in the foregoing calculation, the SA resource indication information may have a larger value. In a manner, more bits are allocated to the SA resource indication information, for example, seven or eight bits. In another manner, six bits are still used for the SA resource indication information. However, a manner described in the following (3) is used.

(3) There is a fixed relationship between some frequency domain resources for all times of transmission. In a possible implementation, frequency domain resource locations for a relatively small quantity of transmission times are defined by using (2), and frequency domain resource locations for a larger quantity of transmission times are obtained by performing repeated extension. For example, for a quantity of transmission times less than or equal to 3, frequency domain resource locations are defined by using (2) (a total quantity of possibilities is less than 64, and six bits may still be used). When the quantity of transmission times is more than 3, frequency domain resource locations for excessive transmission may be obtained by using frequency domain resource locations for first three times of transmission (for example, repetition or symmetry). When the quantity of transmission times is 4, a frequency domain resource used for the fourth transmission is the same as that for the first transmission, or a same frequency domain resource is used for the fourth transmission and the third transmission, and so on.

Figure 7:
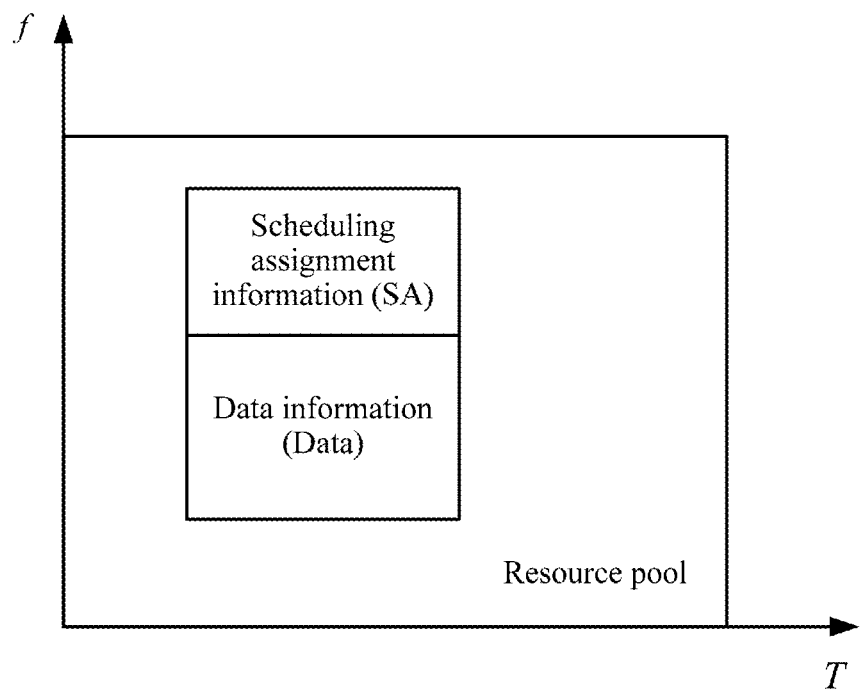
FIG. 7 is a schematic diagram of a time-frequency relationship in a third multiplexing manner according to an embodiment of the present invention.

Based on a third multiplexing manner shown in FIG. 7, when the data occupies consecutive RBs in frequency domain, SA resource indication information may be used to indicate a specific side of the data on which the SA is located (for example, indicate whether the SA is on an upside or a downside of the data). When the quantity of transmission times is more than 1, there may be a fixed relationship between relative locations of SA frequency domain resources for all times of transmission, and a relative location for subsequent SA transmission may be completely determined by a relative location for first SA transmission. In a possible implementation, a same relative location is used for each time of transmission. For example, when the SA is on the upside of the data for first transmission, the SA is on the upside of the data for each subsequent transmission. In another possible implementation, each time of transmission has a fixed mode. It is assumed that the SA is transmitted for four times. When the SA is on the upside of the data for the first transmission, locations relative to the data for the second transmission, the third transmission, and the fourth transmission are respectively the downside, the upside, and the downside, and so on. When the quantity of transmission times is more than 1, there may be no fixed relationship between relative locations of SA frequency domain resources for all times of transmission. In other words, for each time of transmission, the SA may be on the upside or may be on the downside relative to the data, but whether the SA is on the upside or on the downside for each time of transmission is completely indicated by using the SA resource indication information. For example, when the SA is transmitted for four times, four bits may be used in the SA resource indication information to indicate a frequency domain relative location for each time of SA transmission relative to the data. A case in which there is another quantity of transmission times is similar. For example, when the quantity of transmission times is 2, only first two times of transmission in the foregoing description are considered.

When the data occupies inconsecutive RBs in frequency domain, SA resource indication information may be used to indicate one or more SA resources used by the SA. When the data occupies two parts of consecutive frequency domain resources, three SA resources may be used, and may be numbered 0, 1, and 2. The SA resource indication information indicates that a middle SA resource (an SA resource 1) is used. When the quantity of transmission times is more than 1, there may be a fixed relationship between relative locations of SA frequency domain resources for all times of transmission. A relative location for subsequent SA transmission may be completely determined by a relative location for first SA transmission. Alternatively, there may be no fixed relationship. In other words, any SA resource may be used for each time of SA transmission, and this is indicated by the SA resource indication information. For a specific indication manner, refer to Manner 2 in the second multiplexing manner shown in FIG. 6. A case in which there is another quantity of transmission times is similar. For example, when the quantity of transmission times is 2, only first two times of transmission in the foregoing description are considered.

It should be noted that relative locations of an SA frequency domain resource and a data frequency domain resource may also be fixed. For example, the SA uses an upmost SA resource regardless of whether the data occupies consecutive RBs. This may be fixed in a protocol, or may be preconfigured on the user equipment, or may be configured by the network device by using an RRC message (system broadcast, RRC dedicated signaling, or the like). In this case, the SA resource indication information does not need to give an indication.

The foregoing mainly describes the solutions in the embodiments of the present invention from a perspective of interaction between devices. It may be understood that, to implement the foregoing functions, each device such as a user equipment or a network device includes a corresponding hardware structure and/or software module for performing each function. A person skilled in the art should be easily aware that with reference to units and algorithm steps in the examples described in the embodiments disclosed in this specification, the present invention can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function unit division may be performed on the user equipment, the network device, and the like based on the foregoing method example. For example, each function unit may be obtained through division based on a corresponding function, or two or more functions may be integrated into one processing unit. The integrated unit may be implemented in a form of hardware, or may be implemented in a form of a software functional unit. It should be noted that the unit division in the embodiments of the present invention is an example, and is only logical function division. There may be another division manner in actual implementation.

Figure 8A:
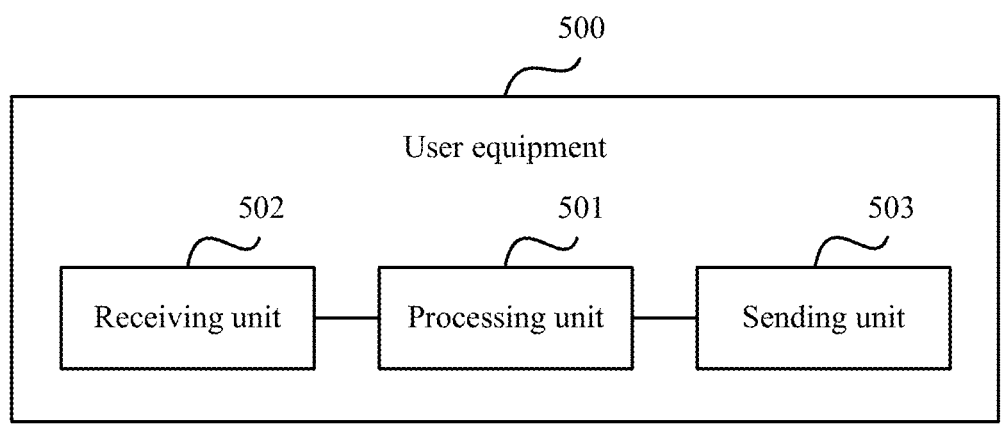
FIG. 8a is a schematic structural diagram of a user equipment according to an embodiment of the present invention.

FIG. 8*a* shows a possible schematic structural diagram of the user equipment in the foregoing embodiments. A user equipment 500 includes a processing unit 501, a receiving unit 502, and a sending unit 503.

The processing unit 501 is configured to obtain a multiplexing manner. The multiplexing manner is used to indicate a relationship between a time-frequency resource for transmitting scheduling assignment information and a time-frequency resource for transmitting data information.

The receiving unit 502 is configured to receive downlink control information sent by a network device. The downlink control information includes scheduling assignment resource indication information.

The processing unit 501 is further configured to obtain, based on the scheduling assignment resource indication information and the multiplexing manner, resource location information occupied to transmit the scheduling assignment information.

The sending unit 503 is configured to transmit the scheduling assignment information based on the resource location information occupied by the scheduling assignment information.

The multiplexing manner includes at least one of a first multiplexing manner, a second multiplexing manner, and a third multiplexing manner, the first multiplexing manner indicates that a time domain resource for transmitting the scheduling assignment information is different from a time domain resource for transmitting the data information, the second multiplexing manner indicates that a time domain resource for transmitting the scheduling assignment information is the same as a time domain resource for transmitting the data information, and a frequency domain resource for transmitting the scheduling assignment information is not adjacent to a frequency domain resource for transmitting the data information, and the third multiplexing manner indicates that a time domain resource for transmitting the scheduling assignment information is the same as a time domain resource for transmitting the data information, and a frequency domain resource for transmitting the scheduling assignment information is adjacent to a frequency domain resource for transmitting the data information.

If the multiplexing manner is the first multiplexing manner, the scheduling assignment resource indication information is used to indicate a time domain resource location and a frequency domain resource location that are occupied to transmit the scheduling assignment information; or if the multiplexing manner is the second multiplexing manner, the scheduling assignment resource indication information is used to indicate a frequency domain resource location occupied to transmit the scheduling assignment information; or if the multiplexing manner is the third multiplexing manner, the scheduling assignment resource indication information is used to indicate a relationship between a frequency domain resource location occupied to transmit the scheduling assignment information and a frequency domain resource location occupied to transmit the data information.

If the multiplexing manner is the first multiplexing manner, the processing unit 501 is configured to obtain, based on the scheduling assignment resource indication information and the first multiplexing manner, the time domain resource location and the frequency domain resource location that are occupied to transmit the scheduling assignment information.

If the multiplexing manner is the second multiplexing manner, the processing unit 501 is configured to obtain, based on the scheduling assignment resource indication information and the second multiplexing manner, the frequency domain resource location occupied to transmit the scheduling assignment information.

The processing unit 501 is further configured to: obtain a time domain resource location occupied to transmit the data information, and determine that the time domain resource location occupied to transmit the data information is a time domain resource location occupied to transmit the scheduling assignment information.

If the multiplexing manner is the third multiplexing manner, the processing unit 501 is configured to: obtain a time domain resource location and the frequency domain resource location that are occupied to transmit the data information, and determine that the time domain resource location for transmitting the data information is a time domain resource location occupied to transmit the scheduling assignment information.

The processing unit 501 is further configured to obtain, based on the scheduling assignment resource indication information, the third multiplexing manner, and the frequency domain resource location of the data information, the frequency domain resource location occupied to transmit the scheduling assignment information.

The downlink control information further includes transmission quantity indication information, the transmission quantity indication information is used to indicate that a quantity of transmission times of the scheduling assignment information is at least one time, and the scheduling assignment resource indication information is used to indicate resource location information occupied to transmit the scheduling assignment information each of the at least one time.

The processing unit 501 is configured to obtain the multiplexing manner based on received multiplexing indication information sent by the network device, where the multiplexing indication information is used to indicate the multiplexing manner; or the processing unit is configured to obtain the multiplexing manner based on preconfiguration information, where the preconfiguration information is used to indicate the multiplexing manner.

It should be noted that the processing unit 501 is configured to perform steps 102 and 105 in the embodiment shown in FIG. 2, the receiving unit 502 is configured to perform step 104 in the embodiment shown in FIG. 2, and the sending unit 503 is configured to perform step 106 in the embodiment shown in FIG. 2.

The processing unit 501 may be a processor or a controller, for example, may be a central processing unit (CPU), a general purpose processor, a digital signal processor (DSP), an application-specific integrated circuit (ASIC), a field programmable gate array (FPGA) or another programmable logic component, a transistor logic component, a hardware component, or any combination thereof. The processing unit 501 may implement or execute various example logical blocks, modules, and circuits described with reference to content disclosed in the present invention. Alternatively, the processor may be a combination that implements a computing function, for example, a combination that includes one or more microprocessors, or a combination of the DSP and a microprocessor. The receiving unit 502 and the sending unit 503 may be transceivers, transceiver circuits, communications modules, or the like.

Figure 8B:
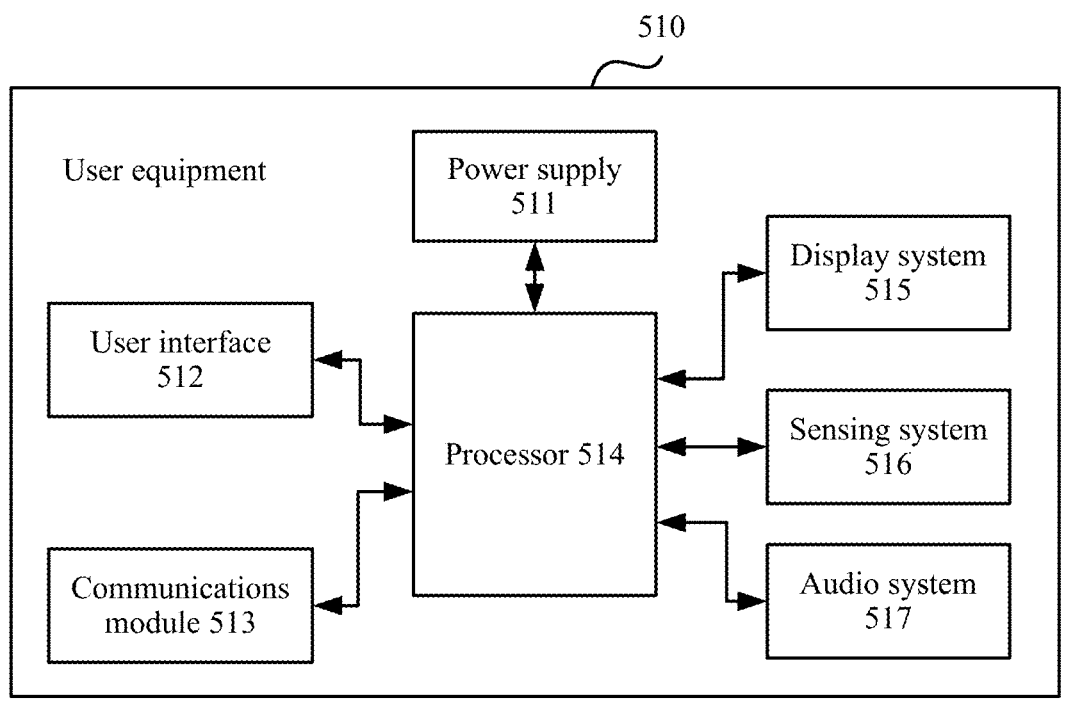
FIG. 8b is a schematic structural diagram of another user equipment according to an embodiment of the present invention.

When the processing unit 501 is a processor, and the receiving unit 502 and the sending unit 503 are communications modules, the user equipment in the embodiments of the present invention may be a user equipment shown in FIG. 8*b*.

As shown in FIG. 8*b*, the user equipment 510 includes: a power supply 511, a user interface 512, a communications module 513, a processor 514, a display system 515, a sensing system 516, and an audio system 517. It should be noted that the user equipment 510 may represent the terminal in FIG. 1*a*, or may represent an electronic device such as a motor vehicle, a non-motor vehicle, another communications device on a road, or an intelligent household appliance. A structure of the user equipment shown in FIG. 8*b* does not constitute a limitation on the embodiments of the present invention.

The power supply 511 guarantees power for implementing various functions of the user equipment 510. The user interface 512 is configured to connect the user equipment 510 and another device or apparatus, to implement communication or data transmission between the another device or apparatus and the user equipment 510. The communications module 513 is configured to implement communication or data transmission between the user equipment 510 and a network side device such as a base station and a satellite, and is further configured to implement communication or data transmission between the user equipment 510 and other user equipment. In the embodiments of the present invention, the communications module 513 is configured to implement functions of the receiving unit 502 and the sending unit 503 shown in FIG. 8a. The processor 514 may implement or execute various example logical blocks, modules, and circuits described with reference to content disclosed in the present invention. In the embodiments of the present invention, the processor 514 is configured to implement a function of the processing unit 501 shown in FIG. 8a. The display system 515 is configured to output and display information, and receive a user-inputted operation. The sensing system 516 includes various sensors such as a temperature sensor, a distance sensor, and the like. The audio system 517 is configured to output an audio signal.

Figure 9A:
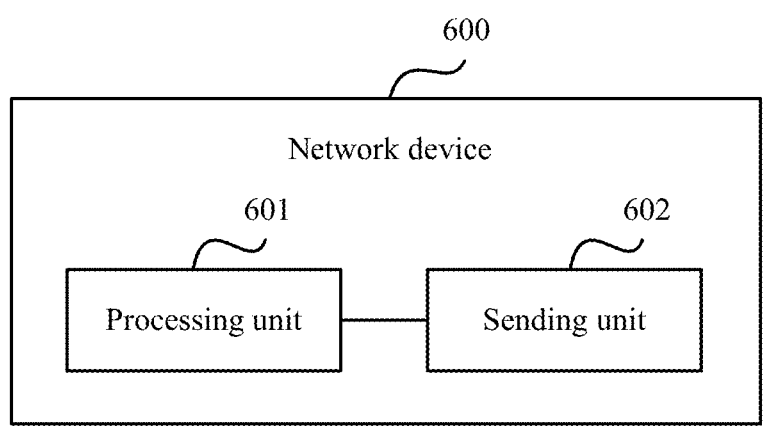
FIG. 9a is a schematic structural diagram of a network device according to an embodiment of the present invention.

FIG. 9a shows a possible schematic structural diagram of the network device in the foregoing embodiments. A network device 600 includes a processing unit 601 and a sending unit 602.

The processing unit 601 is adapted to configure a multiplexing manner for a user equipment. The multiplexing manner is used to indicate a relationship between a time-frequency resource for transmitting scheduling assignment information and a time-frequency resource for transmitting data information.

The sending unit 602 is configured to send downlink control information to the user equipment based on the multiplexing manner. The downlink control information includes scheduling assignment resource indication information, and the scheduling assignment resource indication information is used to indicate resource location information occupied to transmit the scheduling assignment information.

The multiplexing manner includes at least one of a first multiplexing manner, a second multiplexing manner, and a third multiplexing manner, the first multiplexing manner indicates that a time domain resource for transmitting the scheduling assignment information is different from a time domain resource for transmitting the data information, the second multiplexing manner indicates that a time domain resource for transmitting the scheduling assignment information is the same as a time domain resource for transmitting the data information, and a frequency domain resource for transmitting the scheduling assignment information is not adjacent to a frequency domain resource for transmitting the data information, and the third multiplexing manner indicates that a time domain resource for transmitting the scheduling assignment information is the same as a time domain resource for transmitting the data information, and a frequency domain resource for transmitting the scheduling assignment information is adjacent to a frequency domain resource for transmitting the data information.

If the multiplexing manner is the first multiplexing manner, the scheduling assignment resource indication information is used to indicate a time domain resource location and a frequency domain resource location that are occupied to transmit the scheduling assignment information; or if the multiplexing manner is the second multiplexing manner, the scheduling assignment resource indication information is used to indicate a frequency domain resource location occupied to transmit the scheduling assignment information; or if the multiplexing manner is the third multiplexing manner, the scheduling assignment resource indication information is used to indicate a relationship between a frequency domain resource location occupied to transmit the scheduling assignment information and a frequency domain resource location occupied to transmit the data information.

The downlink control information further includes transmission quantity indication information, the transmission quantity indication information is used to indicate that a quantity of transmission times of the scheduling assignment information is at least one time, and the scheduling assignment resource indication information is used to indicate resource location information occupied to transmit the scheduling assignment information each of the at least one time.

The sending unit 602 is further configured to send multiplexing indication information to the user equipment based on the multiplexing manner. The multiplexing indication information is used to indicate the multiplexing manner.

It should be noted that the processing unit 601 is configured to perform step 101 in the embodiment shown in FIG. 2, and the sending unit 602 is configured to perform step 103 in the embodiment shown in FIG. 2.

The processing unit 601 may be a processor or a controller, for example, may be a CPU, a general purpose processor, a DSP, an ASIC, an FPGA, or another programmable logic device, a transistor logic device, a hardware component, or any combination thereof. The processing unit 601 may implement or execute various example logical blocks, modules, and circuits described with reference to content disclosed in the present invention. Alternatively, the processor may be a combination that implements a computing function, for example, a combination that includes one or more microprocessors, or a combination of the DSP and a microprocessor. The sending unit 602 may be a transceiver, a transceiver circuit, a communications interface, or the like.

Figure 9B:
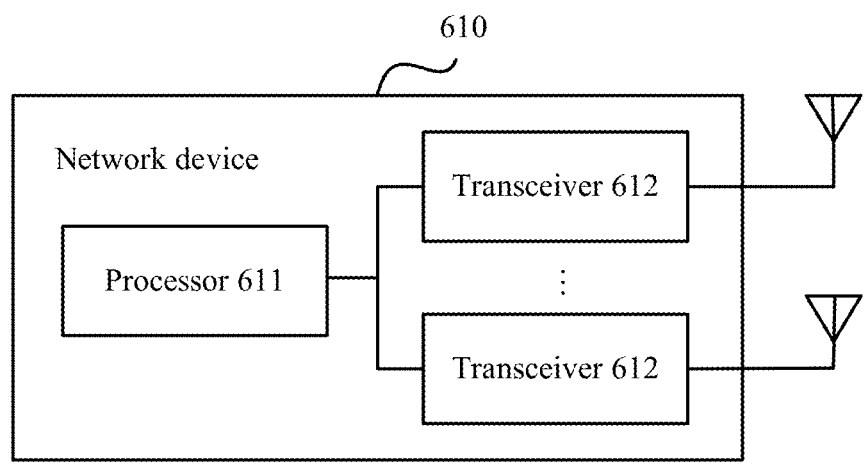
FIG. 9b is a schematic structural diagram of another network device according to an embodiment of the present invention.

When the processing unit 601 is a processor, and the sending unit 602 is a transceiver, the network device in the embodiments of the present invention may be a network device shown in FIG. 9b.

Referring to FIG. 9b, the network device 610 includes a processor 611, a transceiver 612, and an antenna. It should be noted that in actual application, a quantity of the transceivers 612 is not limited to two, a quantity of the antennas is not limited to two, and a structure of the network device 610 does not constitute a limitation on the embodiments of the present invention.

The processor 610 mainly includes four components: a cell controller, a voice channel controller, a signaling channel controller, and a multi-port interface for expansion. The processor 610 is responsible for managing all mobile communications interfaces, and is mainly responsible for radio channel allocation, release, and management. The processor 610 is configured to implement a function of the processing unit 601 shown in FIG. 9a in the embodiments of the present invention. The transceiver 612 includes a receiver and a transmitter. A user equipment may transmit uplink data by using the transmitter, and receive downlink data by using the receiver. The transceiver 612 is configured to implement a function of the sending unit 602 shown in FIG. 9a in the embodiments of the present invention.

An embodiment of the present invention further provides a computer storage medium, configured to store a computer software instruction used by the user equipment, where the computer software instruction includes a program designed to execute the foregoing aspects.

An embodiment of the present invention further provides a computer storage medium, configured to store a computer software instruction used by the network device, where the computer software instruction includes a program designed to execute the foregoing aspects.

An embodiment of the present invention further provides a scheduling assignment information transmission system, including the user equipment shown in FIG. 8a and the network device shown in FIG. 9a, or the user equipment shown in FIG. 8b, and the network device shown in FIG. 9b.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also appreciate that all the embodiments described in this specification are preferred embodiments, and the related actions and modules are not necessarily mandatory to the present invention.

In the foregoing embodiments, the description of each embodiment has respective focuses. For a part that is not described in detail in an embodiment, refer to related descriptions in other embodiments.

The steps of the method in the embodiments of the present invention may be sequentially adjusted, combined, or deleted based on an actual requirement.

The units in the apparatus in the embodiments of the present invention may be combined, divided, and deleted based on an actual requirement. A person skilled in the art may integrate or combine different embodiments and features of different embodiments described in this specification.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a computer. The following is used as an example but is not limited: The computer readable medium may include a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber cable, twisted pair, DSL or wireless technologies such as infrared ray, radio and microwave are included in fixation of a medium to which they belong. For example, a disk and disc used by the present invention includes a compact disc (CD), a laser disc, an optical disc, a digital versatile disc (DVD), a floppy disk and a Blu-ray disc. The disk generally copies data by a magnetic means, and the disc copies data optically by a laser means. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A scheduling assignment information transmission method in vehicle-to-vehicle (V2V) communication, comprising:
    obtaining, by a user equipment, a multiplexing manner from a plurality of multiplexing manners in the V2V communication, wherein the multiplexing manner is used to indicate a relationship between a time-frequency resource for transmitting scheduling assignment information and a time-frequency resource for transmitting data information, wherein the plurality of multiplexing manners comprise a first multiplexing manner, a second multiplexing manner, and a third multiplexing manner, and wherein:
        the first multiplexing manner indicates that a time domain resource for transmitting the scheduling assignment information is different from a time domain resource for transmitting the data information;
        the second multiplexing manner indicates that a time domain resource for transmitting the scheduling assignment information is the same as a time domain resource for transmitting the data information, wherein a frequency domain resource for transmitting the scheduling assignment information is not adjacent to a frequency domain resource for transmitting the data information; and
        the third multiplexing manner indicates that a time domain resource for transmitting the scheduling assignment information is the same as a time domain resource for transmitting the data information, wherein a frequency domain resource for transmitting the scheduling assignment information is adjacent to a frequency domain resource for transmitting the data information;
    receiving, by the user equipment, downlink control information sent by a network device, wherein the downlink control information comprises scheduling assignment resource indication information;
    obtaining, by the user equipment, and based on the scheduling assignment resource indication information and the multiplexing manner, resource location information occupied to transmit the scheduling assignment information; and
    transmitting, by the user equipment, the scheduling assignment information based on the resource location information occupied by the scheduling assignment information.

2. The method according to claim 1, wherein the multiplexing manner comprises at least one of the first multiplexing manner, the second multiplexing manner, or the third multiplexing manner.

3. The method according to claim 2, wherein:
    if the multiplexing manner is the first multiplexing manner, the scheduling assignment resource indication information is used to indicate a time domain resource location and a frequency domain resource location that are occupied to transmit the scheduling assignment information;

if the multiplexing manner is the second multiplexing manner, the scheduling assignment resource indication information is used to indicate a frequency domain resource location occupied to transmit the scheduling assignment information; and if the multiplexing manner is the third multiplexing manner, the scheduling assignment resource indication information is used to indicate a relationship between a frequency domain resource location occupied to transmit the scheduling assignment information and a frequency domain resource location occupied to transmit the data information.

4. The method according to claim 1, wherein the downlink control information further comprises transmission quantity indication information, wherein the transmission quantity indication information is used to indicate that a quantity of transmission times of the scheduling assignment information is at least one time, and wherein the scheduling assignment resource indication information is used to indicate resource location information occupied to transmit the scheduling assignment information each of the at least one time.

5. The method according to claim 1, wherein the obtaining, by a user equipment, a multiplexing manner comprises:

obtaining, by the user equipment, the multiplexing manner based on a received multiplexing indication information sent by the network device, wherein the multiplexing indication information is used to indicate the multiplexing manner; or obtaining, by the user equipment, the multiplexing manner based on preconfiguration information, wherein the preconfiguration information is used to indicate the multiplexing manner.

6. A scheduling assignment information transmission method, comprising:

configuring, by a network device, a multiplexing manner for a user equipment from a plurality of multiplexing manners, wherein the plurality of multiplexing manners are for different resource pools or for different cells, wherein the multiplexing manner is used to indicate a relationship between a time-frequency resource for transmitting scheduling assignment information and a time-frequency resource for transmitting data information, wherein the plurality of multiplexing manners comprise a first multiplexing manner, a second multiplexing manner, and a third multiplexing manner, and wherein:

the first multiplexing manner indicates that a time domain resource for transmitting the scheduling assignment information is different from a time domain resource for transmitting the data information;

the second multiplexing manner indicates that a time domain resource for transmitting the scheduling assignment information is the same as a time domain resource for transmitting the data information, wherein a frequency domain resource for transmitting the scheduling assignment information is not adjacent to a frequency domain resource for transmitting the data information; and the third multiplexing manner indicates that a time domain resource for transmitting the scheduling assignment information is the same as a time domain resource for transmitting the data information, wherein a frequency domain resource for transmitting the scheduling assignment information is adjacent to a frequency domain resource for transmitting the data information; and sending, by the network device, downlink control information to the user equipment based on the multiplexing manner, wherein the downlink control information comprises scheduling assignment resource indication information, and wherein the scheduling assignment resource indication information is used to indicate resource location information occupied to transmit the scheduling assignment information.

7. The method according to claim 6, wherein the multiplexing manner comprises at least one of the first multiplexing manner, the second multiplexing manner, or the third multiplexing manner.

8. The method according to claim 7, wherein:

if the multiplexing manner is the first multiplexing manner, the scheduling assignment resource indication information is used to indicate a time domain resource location and a frequency domain resource location that are occupied to transmit the scheduling assignment information;

if the multiplexing manner is the second multiplexing manner, the scheduling assignment resource indication information is used to indicate a frequency domain resource location occupied to transmit the scheduling assignment information; and if the multiplexing manner is the third multiplexing manner, the scheduling assignment resource indication information is used to indicate a relationship between a frequency domain resource location occupied to transmit the scheduling assignment information and a frequency domain resource location occupied to transmit the data information.

9. The method according to claim 6, wherein the downlink control information further comprises transmission quantity indication information, the transmission quantity indication information is used to indicate that a quantity of transmission times of the scheduling assignment information is at least one time, and the scheduling assignment resource indication information is used to indicate resource location information occupied to transmit the scheduling assignment information each of the at least one time.

10. The method according to claim 6, wherein before the sending, by the network device, downlink control information to the user equipment based on the multiplexing manner, the method further comprises:

sending, by the network device, multiplexing indication information to the user equipment based on the multiplexing manner, wherein the multiplexing indication information is used to indicate the multiplexing manner.

11. A user equipment in vehicle-to-vehicle (V2V) communication, comprising:

at least one processor;

one or more memories coupled to the at least one processor and storing programming instructions for execution by the at least one processor to obtain a multiplexing manner from a plurality of multiplexing manners in the V2V communication, wherein the multiplexing manner is used to indicate a relationship between a time-frequency resource for transmitting scheduling assignment information and a time-frequency resource for transmitting data information, wherein the plurality of multiplexing manners comprise a first multiplexing manner, a second multiplexing manner, and a third multiplexing manner, and wherein:

the first multiplexing manner indicates that a time domain resource for transmitting the scheduling assignment information is different from a time domain resource for transmitting the data information;

the second multiplexing manner indicates that a time domain resource for transmitting the scheduling assignment information is the same as a time domain resource for transmitting the data information, wherein a frequency domain resource for transmitting the scheduling assignment information is not adjacent to a frequency domain resource for transmitting the data information; and the third multiplexing manner indicates that a time domain resource for transmitting the scheduling assignment information is the same as a time domain resource for transmitting the data information, wherein a frequency domain resource for transmitting the scheduling assignment information is adjacent to a frequency domain resource for transmitting the data information;

a receiver, the receiver configured to receive downlink control information sent by a network device, wherein the downlink control information comprises scheduling assignment resource indication information, wherein:

the programming instructions are for execution by the at least one processor to obtain, based on the scheduling assignment resource indication information and the multiplexing manner, resource location information occupied to transmit the scheduling assignment information; and a transmitter, the transmitter configured to transmit the scheduling assignment information based on the resource location information occupied by the scheduling assignment information.

12. The user equipment according to claim 11, wherein the multiplexing manner comprises at least one of the first multiplexing manner, the second multiplexing manner, or the third multiplexing manner.

13. The user equipment according to claim 12, wherein:
if the multiplexing manner is the first multiplexing manner, the scheduling assignment resource indication information is used to indicate a time domain resource location and a frequency domain resource location that are occupied to transmit the scheduling assignment information;
if the multiplexing manner is the second multiplexing manner, the scheduling assignment resource indication information is used to indicate a frequency domain resource location occupied to transmit the scheduling assignment information; and
if the multiplexing manner is the third multiplexing manner, the scheduling assignment resource indication information is used to indicate a relationship between a frequency domain resource location occupied to transmit the scheduling assignment information and a frequency domain resource location occupied to transmit the data information.

14. The user equipment according to claim 11, wherein the downlink control information further comprises transmission quantity indication information, wherein the transmission quantity indication information is used to indicate that a quantity of transmission times of the scheduling assignment information is at least one time, and wherein the scheduling assignment resource indication information is used to indicate resource location information occupied to transmit the scheduling assignment information each of the at least one time.

15. The user equipment according to claim 11, wherein the programming instructions are for execution by the at least one processor to:
obtain the multiplexing manner based on a received multiplexing indication information sent by the network device, wherein the multiplexing indication information is used to indicate the multiplexing manner; or
obtain the multiplexing manner based on preconfiguration information, wherein the preconfiguration information is used to indicate the multiplexing manner.

16. A network device, comprising:
at least one processor;
one or more memories coupled to the at least one processor and storing programming instructions for execution by the at least one processor to configure a multiplexing manner for a user equipment from a plurality of multiplexing manners, wherein the plurality of multiplexing manners are for different resource pools or for different cells, wherein the multiplexing manner is used to indicate a relationship between a time-frequency resource for transmitting scheduling assignment information and a time-frequency resource for transmitting data information, wherein the plurality of multiplexing manners comprise a first multiplexing manner, a second multiplexing manner, and a third multiplexing manner, and wherein:

the first multiplexing manner indicates that a time domain resource for transmitting the scheduling assignment information is different from a time domain resource for transmitting the data information;

the second multiplexing manner indicates that a time domain resource for transmitting the scheduling assignment information is the same as a time domain resource for transmitting the data information, wherein a frequency domain resource for transmitting the scheduling assignment information is not adjacent to a frequency domain resource for transmitting the data information; and the third multiplexing manner indicates that a time domain resource for transmitting the scheduling assignment information is the same as a time domain resource for transmitting the data information, wherein a frequency domain resource for transmitting the scheduling assignment information is adjacent to a frequency domain resource for transmitting the data information; and a transmitter, the transmitter configured to send downlink control information to the user equipment based on the multiplexing manner, wherein the downlink control information comprises scheduling assignment resource indication information, and wherein the scheduling assignment resource indication information is used to indicate resource location information occupied to transmit the scheduling assignment information.

17. The network device according to claim 16, wherein the multiplexing manner comprises at least one of the first multiplexing manner, the second multiplexing manner, or the third multiplexing manner.

18. The network device according to claim 17, wherein:
if the multiplexing manner is the first multiplexing manner, the scheduling assignment resource indication information is used to indicate a time domain resource location and a frequency domain resource location that are occupied to transmit the scheduling assignment information;
if the multiplexing manner is the second multiplexing manner, the scheduling assignment resource indication information is used to indicate a frequency domain resource location occupied to transmit the scheduling assignment information; and if the multiplexing manner is the third multiplexing manner, the scheduling assignment resource indication information is used to indicate a relationship between a frequency domain resource location occupied to transmit the scheduling assignment information and a frequency domain resource location occupied to transmit the data information.

19. The network device according to claim 16, wherein the downlink control information further comprises transmission quantity indication information, wherein the transmission quantity indication information is used to indicate that a quantity of transmission times of the scheduling assignment information is at least one time, and wherein the scheduling assignment resource indication information is used to indicate resource location information occupied to transmit the scheduling assignment information each of the at least one time.

20. The network device according to claim 16, wherein the transmitter is further configured to send multiplexing indication information to the user equipment based on the multiplexing manner, wherein the multiplexing indication information is used to indicate the multiplexing manner.

* * * * *